(12) United States Patent  (10) Patent No.: US 8,364,000 B2
Gonzalez et al.  (45) Date of Patent: Jan. 29, 2013

(54) FIBER OPTIC CABLE CLAMP

(75) Inventors: Jaime Gonzalez, Shakopee, MN (US);
Cindy S. Walters, Prior Lake, MN (US);
James J. Solheid, Lakeville, MN (US);
Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 131 days.

(21) Appl. No.: 12/772,567

(22) Filed: May 3, 2010

(65) Prior Publication Data

US 2010/0215331 A1  Aug. 26, 2010

Related U.S. Application Data

(62) Division of application No. 11/975,904, filed on Oct. 22, 2007, now Pat. No. 7,711,236.

(51) Int. Cl.
*G02B 6/00* (2006.01)

(52) U.S. Cl. .................................. 385/137; 385/136

(58) Field of Classification Search ........... 385/134–137
See application file for complete search history.

(56) References Cited

U.S. PATENT DOCUMENTS

| | | |
|---|---|---|
| 712,765 A | 11/1902 | Cole |
| 1,390,654 A | 9/1921 | Stork |
| 2,355,166 A | 8/1944 | Johanson |
| 2,642,474 A | 6/1953 | Bowar |
| 2,823,248 A | 2/1958 | Schaefer |
| 3,160,457 A | 12/1964 | Fischer |
| 3,494,580 A | 2/1970 | Thorsman |
| 3,624,679 A | 11/1971 | Ziegler, Jr. |
| 3,673,546 A | 6/1972 | Green et al. |
| 4,128,918 A | 12/1978 | Wenk |
| 4,243,290 A | 1/1981 | Williams |
| 4,317,262 A | 3/1982 | Wells, Jr. |
| 4,447,120 A | 5/1984 | Borsuk |
| 4,542,858 A | 9/1985 | Manages |
| 4,639,064 A | 1/1987 | Knapp et al. |
| 4,657,425 A | 4/1987 | Takahashi |
| 4,717,792 A | 1/1988 | Sterritt et al. |
| 4,799,902 A | 1/1989 | Laudig et al. |
| 4,813,887 A | 3/1989 | Capp |

(Continued)

FOREIGN PATENT DOCUMENTS

| | | |
|---|---|---|
| AT | 221618 | 6/1962 |
| DE | 679 938 | 8/1939 |

(Continued)

OTHER PUBLICATIONS

ADC Telecommunications, Inc., Broadcast Products Catalog, 9th Edition, front cover, pp. 100-105, and rear cover (Mar. 2001).

(Continued)

*Primary Examiner* — Daniel Petkovsek
(74) *Attorney, Agent, or Firm* — Merchant & Gould P.C.

(57) ABSTRACT

A fiber optic cable clamp is provided. The fiber optic cable clamp includes a sheath grip member and a strength member clamp maintained at a constant axial location with respect to the sheath grip member. The fiber optic cable clamp also includes a cable fiber separator connected to the sheath grip member, the cable fiber separator including a plurality of cable fiber openings and attached to the strength member clamp. The fiber optic cable clamp, when mounted to a fiber optic cable, maintains the relative axial locations of a cable sheath and cable strength member along a fiber optic cable.

14 Claims, 26 Drawing Sheets

U.S. PATENT DOCUMENTS

| | | |
|---|---|---|
| 4,875,864 A | 10/1989 | Campbell |
| D307,541 S | 5/1990 | Tres |
| 4,936,795 A | 6/1990 | Kawai et al. |
| 4,938,714 A | 7/1990 | Kawai et al. |
| 4,991,928 A | 2/1991 | Zimmer |
| 5,007,862 A | 4/1991 | Defibaugh et al. |
| 5,048,918 A | 9/1991 | Daems et al. |
| 5,230,489 A | 7/1993 | White et al. |
| 5,243,139 A | 9/1993 | Law |
| 5,307,037 A | 4/1994 | Woods et al. |
| D347,384 S | 5/1994 | White et al. |
| 5,469,613 A | 11/1995 | McMills et al. |
| 5,573,423 A | 11/1996 | Lin et al. |
| 5,645,450 A | 7/1997 | Yamada et al. |
| 5,675,124 A | 10/1997 | Stough et al. |
| 5,675,128 A | 10/1997 | Simon |
| 5,725,185 A | 3/1998 | Auclair |
| 5,773,759 A | 6/1998 | Hablützel |
| 5,785,554 A | 7/1998 | Ohshiro |
| 5,793,921 A | 8/1998 | Wilkins et al. |
| 5,800,195 A | 9/1998 | Endo et al. |
| 5,807,138 A | 9/1998 | Guioi |
| 5,862,291 A | 1/1999 | Stockman et al. |
| 5,937,488 A | 8/1999 | Geiger |
| 5,967,852 A | 10/1999 | Follingstad et al. |
| 5,998,737 A | 12/1999 | Weiss et al. |
| 6,109,963 A | 8/2000 | Follingstad et al. |
| 6,126,122 A | 10/2000 | Ismert |
| 6,146,192 A | 11/2000 | Cabalka et al. |
| 6,164,605 A | 12/2000 | Drake et al. |
| 6,203,331 B1 | 3/2001 | McHugh et al. |
| 6,206,331 B1 | 3/2001 | Keith et al. |
| 6,231,380 B1 | 5/2001 | Cabalka et al. |
| 6,398,169 B1 | 6/2002 | Streit |
| 6,463,631 B2 | 10/2002 | Noda |
| 6,466,725 B2 | 10/2002 | Battey et al. |
| 6,487,344 B1 | 11/2002 | Naudin et al. |
| D473,130 S | 4/2003 | Leung |
| 6,595,472 B1 | 7/2003 | Pisczak |
| 6,726,166 B2 | 4/2004 | Goodman |
| 6,846,988 B2 | 1/2005 | Khemakhem et al. |
| 6,994,300 B2 | 2/2006 | Labeirie et al. |
| 7,178,203 B2 | 2/2007 | Pearson et al. |
| 7,197,821 B2 | 4/2007 | Khemakhem et al. |
| 7,223,918 B2 | 5/2007 | Gelibert |
| 7,254,307 B2 | 8/2007 | Xin |
| 7,711,236 B2 * | 5/2010 | Gonzalez et al. .............. 385/137 |
| 2006/0233509 A1 | 10/2006 | Ray et al. |
| 2007/0175027 A1 | 8/2007 | Khemakhem et al. |

FOREIGN PATENT DOCUMENTS

| | | |
|---|---|---|
| DE | 43 01 269 A1 | 7/1994 |
| EP | 0 167 738 A2 | 1/1986 |
| EP | 0 716 324 A1 | 6/1996 |
| FR | 2 822 250 A1 | 9/2002 |
| WO | WO 00/72072 A1 | 11/2000 |
| WO | WO 2005/020400 A1 | 3/2005 |

OTHER PUBLICATIONS

ADC Telecommunications, Inc., ProAx™ Triaxial Camera Connector, 8 pages (Jun. 1998).

International Search Report and Written Opinion mailed Feb. 13, 2009.

Kings Electronics Co., Inc., Broadcast Products Catalog 801, pp. 1, 25-37, and 45-50 (Copyright 2001).

* cited by examiner

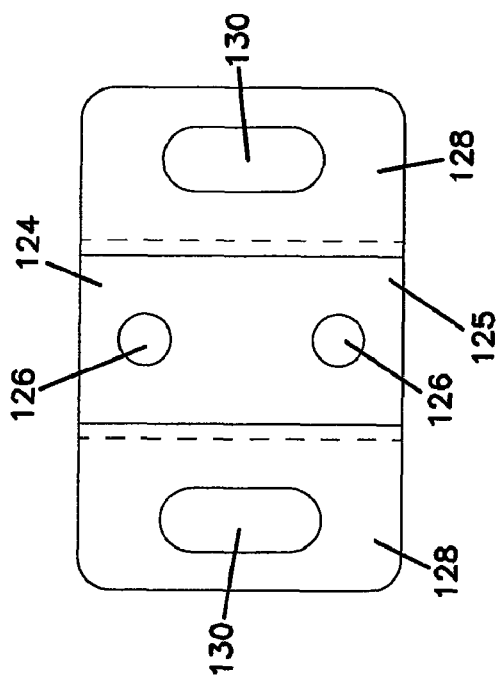
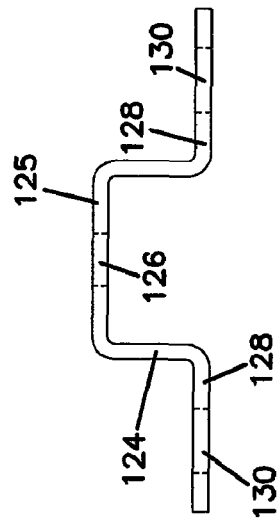
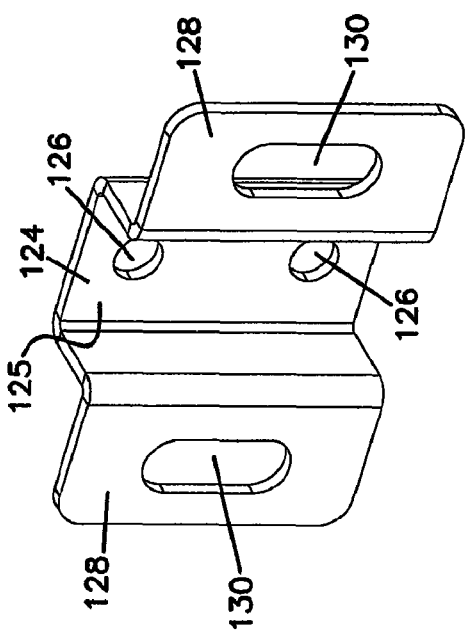

FIBER OPTIC CABLE CLAMP

CROSS REFERENCE TO RELATED APPLICATION

This application is a divisional of application Ser. No. 11/975,904, filed Oct. 22, 2007, which application is incorporated herein by reference in its entirety.

TECHNICAL FIELD

The present disclosure relates to fiber optic cable systems. More specifically, the present disclosure relates to a fiber optic cable clamp.

BACKGROUND

Multifiber optical cables, particularly those for use in outside the plant applications in which the cable is exposed to environmental conditions, may include a protective sheath surrounding the optical fibers of the cable. In some instances, these optical cables can also include a non-fiber strength member in the center of the cable, designed to protect the cable from bending more than the approved bend radius of the cable to prevent damage to the cable and loss of optical signal strength.

When multifiber optical cables are routed outside of a building or enclosure, that cable is exposed to environmental extremes, including temperature extremes. These temperature extremes affect the various components of the multifiber cables differently, based on the varying rates at which temperature affects each of the components. For example, in designing the cables, the strength member and the fiber optical fibers within the cable expand and contract at the same rate, but the protective sheath surrounding the optical fibers generally is made from a plastic material which expands and contracts at a higher rate than the fibers or strength member. This phenomena is described in detail in Gebizlioglu, *Time- and Temperature-Dependent Material Behavior and its Impact on Low-Temperature Performance of Fiber Optic Cables*, (Materials Research Society Proceedings Vol. 531, p. 333 (1998)).

At low temperatures, the protective sheath surrounding the optical fibers contracts, exerting a compression force on the optical strands. This compression force can form microbends in the optical fibers, resulting in signal loss along the length of the optical fiber.

SUMMARY

The present disclosure relates generally to a fiber cable clamp for optical fibers. Use of the fiber cable clamp results in maintaining the positional relationship between the protective sheath and the strength member in an optical cable.

In a first aspect, a fiber optic cable clamp is provided. The fiber optic cable clamp includes a sheath grip member and a strength member clamp maintained at a constant axial location with respect to the sheath grip member. The fiber optic cable clamp also includes a cable fiber separator connected to the sheath grip member, the cable fiber separator including a plurality of cable fiber openings and attached to the strength member clamp. The fiber optic cable clamp, when mounted to a fiber optic cable, maintains the relative axial locations of a cable sheath and cable strength member along a fiber optic cable.

In a second aspect, a fiber optic cable clamp is disclosed which is configured for use with a fiber optic cable having a protective sheath, fibers, and a strength member. The fiber optic cable clamp includes a plurality of sheath grip members and is connected to a strength member clamp, which is in turn connected to the plurality of sheath grip members. The fiber optic cable clamp also includes a cable fiber separator integrated with the strength member clamp. The fiber optic cable clamp, when mounted to the fiber optic cable, maintains the relative axial locations of the cable sheath and the strength member.

In a third aspect, a fiber optic cable clamp is disclosed which is configured for use with a fiber optic cable having a protective sheath, fibers, and a strength member. The fiber optic cable clamp includes means for gripping the protective sheath of the fiber optic cable. The fiber optic cable clamp further includes means for clamping the strength member and means for separating fibers of an optical cable. The fiber optic cable clamp also includes connection means for maintaining the relative axial locations of the means for gripping and the means for clamping.

In a fourth aspect, a fiber optic cable clamp assembly is shown. The assembly includes a fiber optic cable including a plurality of optical fibers and a strength member protruding from a cable sheath, with a portion of the protruding optical fibers individually encased by furcation tubes. The assembly also includes a fiber optic cable clamp including a sheath grip member engaged to the cable sheath, and a cable fiber separator connected to the sheath grip member. The cable fiber separator includes a plurality of cable fiber openings sized to receive the furcation tubes and a strength member clamp affixed to the strength member. The fiber optic cable clamp is configured to maintain the relative axial locations of the cable sheath and the cable strength member along the fiber optic cable.

In a fifth aspect, a method of maintaining the relative axial locations of a cable sheath and a cable strength member in an optical cable is disclosed. The method includes providing a fiber optic cable including a plurality of optical fibers and a strength member protruding from a cable sheath. The method includes clamping a strength member clamp to the portion of the strength member protruding from the cable sheath. The method further includes clamping a sheath grip member to the cable sheath. The method also includes installing a cable fiber separator onto the plurality of optical fibers, resulting in one or more of the plurality of optical fibers passing through a plurality of openings of the cable fiber separator, wherein the cable fiber separator connected to the sheath grip member. The method further includes installing a furcation tube over one or more of the optical fibers and into an opening of the cable fiber separator.

BRIEF DESCRIPTION OF THE DRAWINGS

FIG. 11 is a perspective view of a cable clamp mounting structure of the fiber cable clamp of FIG. 1;

FIG. 12 is a front plan view of the cable clamp mounting structure of FIG. 11;

FIG. 13 is a top plan view of the cable clamp mounting structure of FIG. 11;

DETAILED DESCRIPTION

Figure 2:
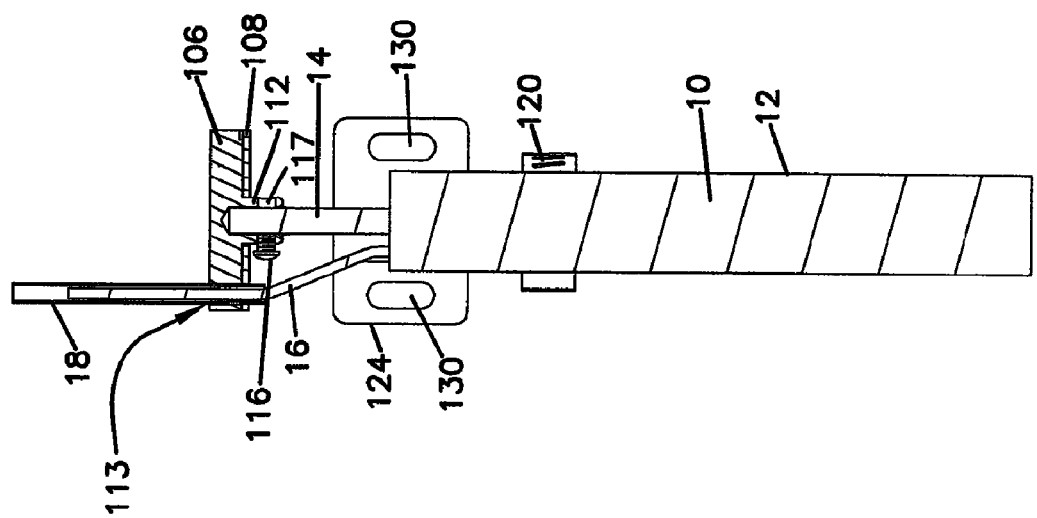
FIG. 2 is a cross-sectional side view of the fiber cable clamp according to the embodiment of FIG. 1.
Figure 1:
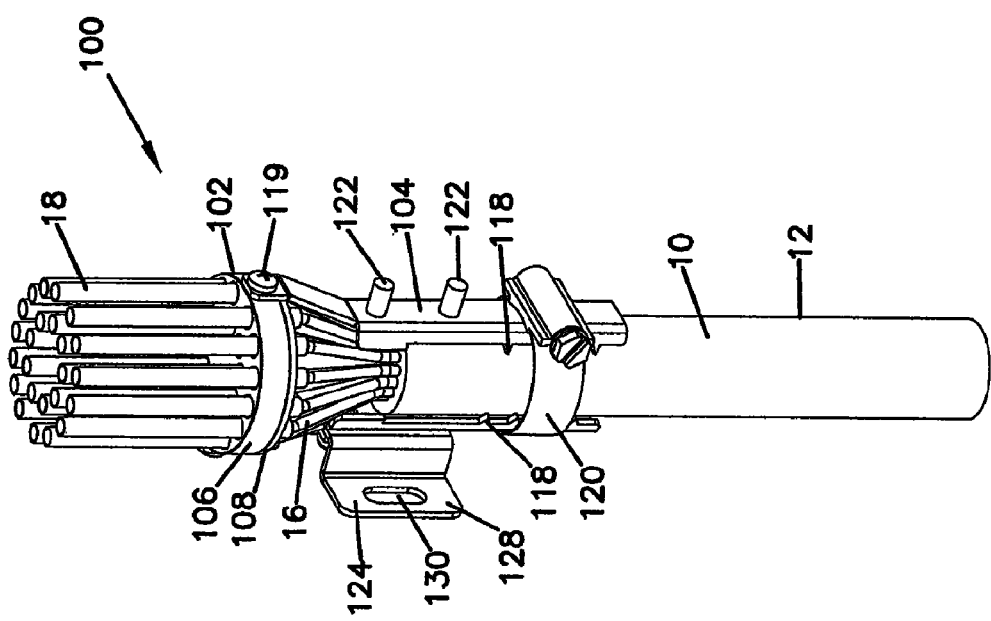
FIG. 1 is a perspective view of a fiber cable clamp installed on a fiber optic cable according to an embodiment of the present disclosure.
Figure 4:
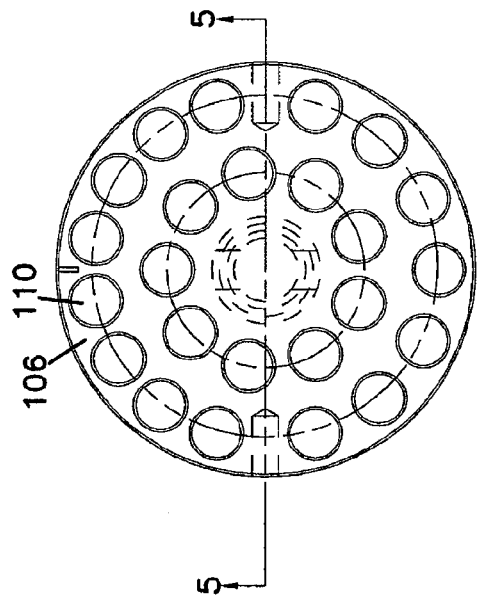
FIG. 4 is a top plan view of the cable fiber separator of FIG. 3.
Figure 5:
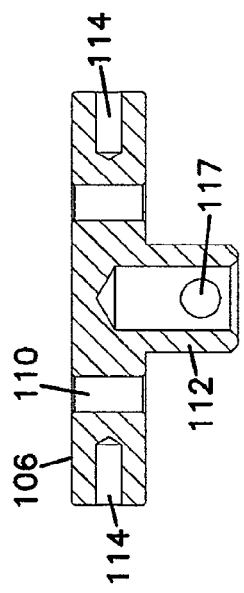
FIG. 5 is a cross-sectional side view of the cable fiber separator of FIG. 3.
Figure 3:
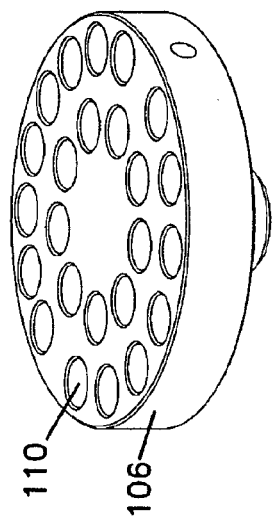
FIG. 3 is a perspective view of the cable fiber separator used in the fiber cable clamp of FIG. 1.
Figure 6:
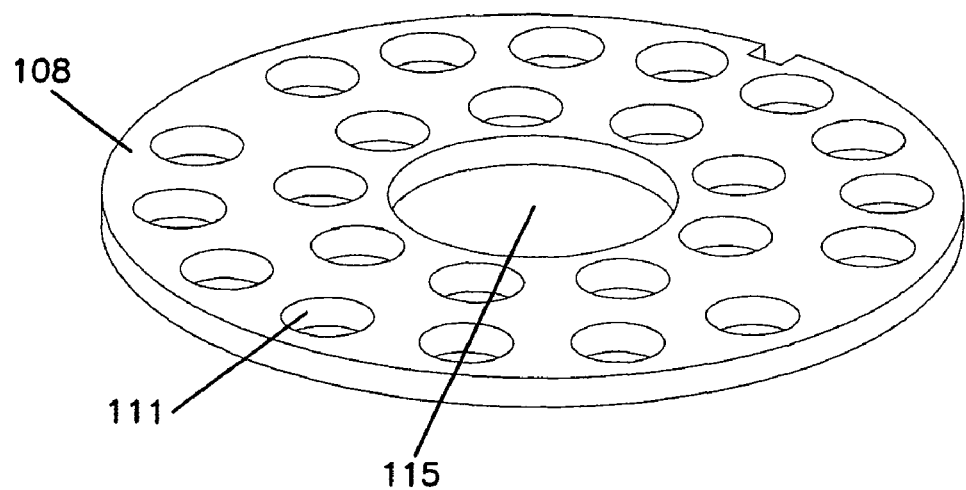
FIG. 6 is a perspective view of a retention plate of the fiber cable clamp of FIG. 1.
Figure 7:
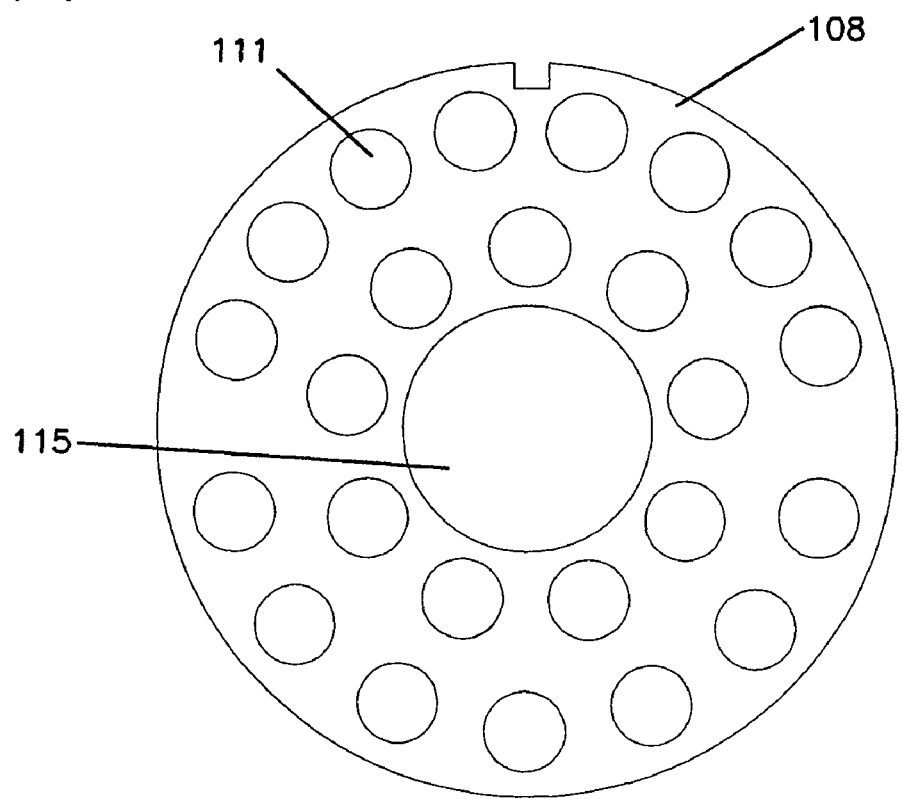
FIG. 7 is a top plan view of the retention plate of FIG. 6.

In general, the present disclosure relates to a fiber cable clamp configured to be mounted to a fiber optic cable having a cable sheath and a strength member. The fiber cable clamp, when mounted to the fiber optic cable, maintains the relative axial locations of the cable sheath and the strength member to prevent signal loss along the cable at a wide variety of temperatures.

Referring now to FIGS. 1-13, various aspects of a fiber cable clamp 100 are disclosed. The fiber cable clamp 100 is designed for use with a multifiber optical cable 10 that includes a cable sheath 12 and a strength member 14. The cable sheath 12 surrounds a plurality of optical fibers 16, which are in turn grouped around the strength member 14. The fiber cable clamp 100 is designed to maintain the relative axial locations of the cable sheath 12 and the strength member 14, despite possible positional shifts due to thermal expansion or contraction of the sheath and strength members at different rates.

The fiber cable clamp 100 includes a cable separator 102 and a plurality of fiber sheath grips 104. The cable separator 102, shown in detail in FIGS. 3-7, includes a first disk 106 and a second disk, shown as a fiber retention plate 108. The first disk includes a plurality of openings 110, and the fiber retention plate 108 has a corresponding plurality of openings 111. In the embodiment shown, the cable openings 110, 111 of the disk 106 and plate 108, respectively, are disposed in concentric circles around a center axis, and coordinate to provide a transverse path 113 allowing fibers to pass therethrough. In other embodiments, the cable openings 110, 111 may be disposed radially from the center point or in some other configuration. The transverse paths 113 through the openings 110, 111 allow the optical fibers 16 to pass through the disk 106 and retention plate 108. In the embodiment shown, the optical fibers 16 are sheathed in furcation tubes 18 inserted through the paths 113, for protecting the optical fibers 16. One or more optical fibers may be sheathed in each furcation tube 18, which may be made of a plastic or some other flexible material. The retention plate 108 acts to grip the furcation tubes 18 to prevent axial movement of the furcation tubes 18 relative to the fiber cable clamp 100.

Disk 106 also includes a central strength member clamp 112 and mounting holes 114. The strength member clamp 112 provides an end limit to how far the strength member 14 can protrude beyond the cable sheath 12. The strength member clamp 112 is located in axial alignment with the fiber optic cable 10, and accepts insertion of the strength member 14. In the embodiment shown, the strength member clamp 112 is formed in the disk 106, and the fiber retention plate 108 includes a central opening 115 sized to allow the strength member clamp 112 to pass therethrough. In one embodiment, the openings 110 in the disk 106 are tapered at the edges, while the openings 111 in the fiber retention plate 108 are untapered. In further embodiments, the openings 110 are larger than the openings 111. In such configurations, the openings 111 in the fiber retention plate 108 grip the furcation tubes 18 while the furcation tubes 18 are moveable axially within the openings 110. Other configurations are possible as well.

An opening 117 is transversely located in the strength member clamp 112 and configured to accept a fastener, shown as a set screw 116. The opening 117 and accompanying set screw 116 are configured to engage the strength member 14 to prevent it from receding from and disengaging with the strength member clamp 112. In the embodiment shown, the strength member clamp 112 includes a cylinder having an opening on one end constructed to fit around the central strength member 14 of the cable 10. Additional openings in the side of the cylinder accept the set screw 116.

The mounting holes 114 are configured to connect the cable separator 102 to the fiber sheath grips 104. In the embodiment shown, mounting holes 114 at opposed edges of the cable separator 102 accept a fastener 119 designed to hold the fiber sheath grips 104 and the cable separator 102 together. The cable separator 102 is pivotally connected to two fiber sheath grips 104 via the fastener 119 and mounting holes 114. In the embodiment shown, the fastener 119 is a screw inserted through the fiber sheath grip 104 and cable separator 102. In further embodiments, more or fewer mounting holes 114 and associated fiber sheath grips 104 may be used, and other fasteners 119 may be used as well, and are generally associated with the number of fibers 16 included in the cable 10.

Figure 10:
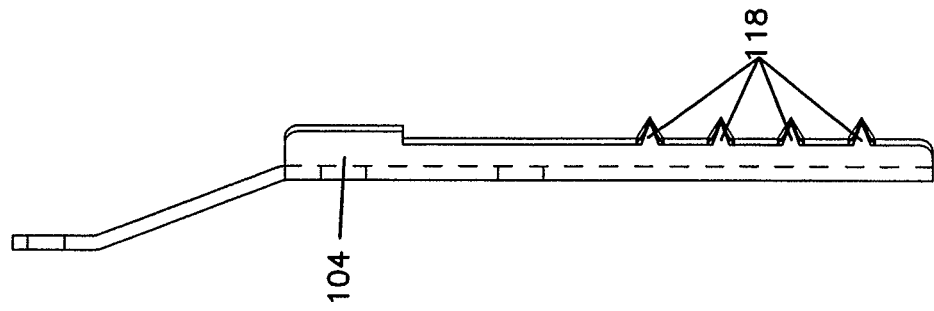
FIG. 10 is a side plan view of the fiber sheath grip of FIG. 8.
Figure 9:
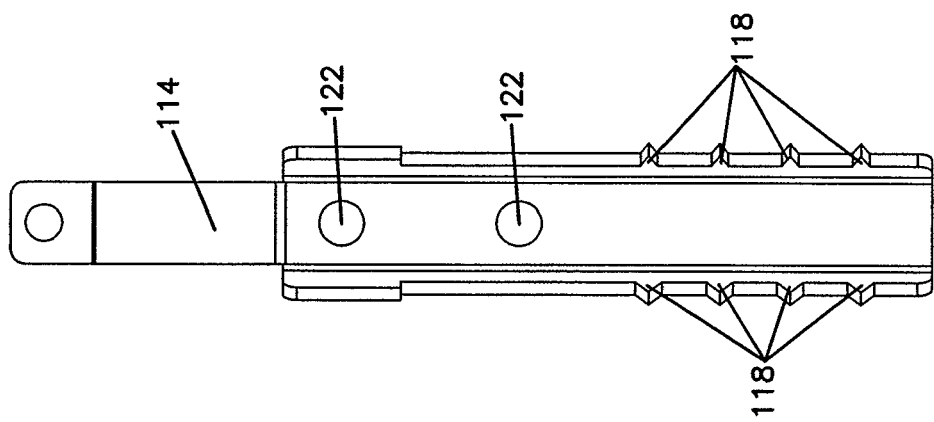
FIG. 9 is a front plan view of the fiber sheath grip of FIG. 8.
Figure 8:
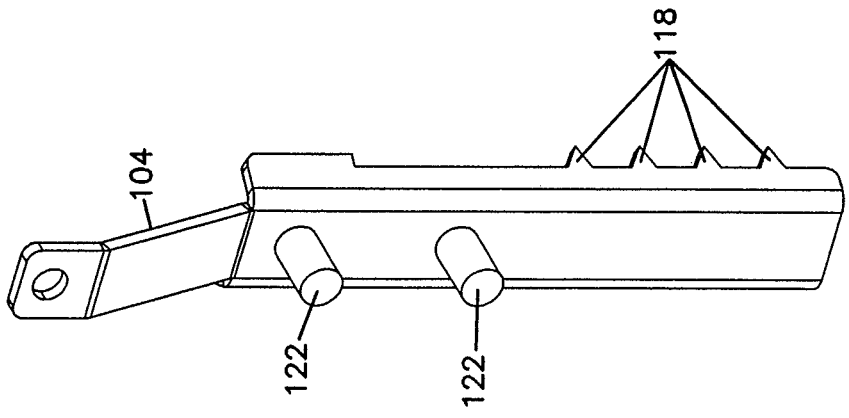
FIG. 8 is a perspective view of a fiber sheath grip of the fiber cable clamp of FIG. 1.
Figure 14:
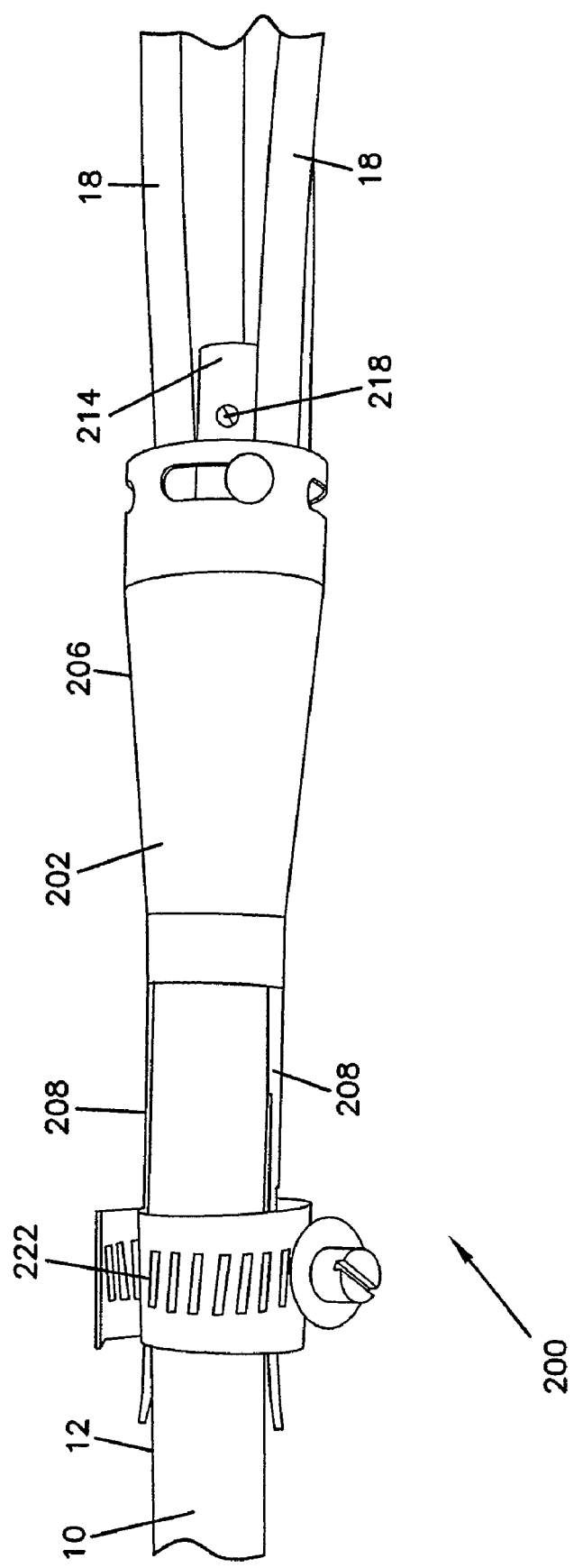
FIG. 14 is a perspective view of a second possible embodiment of a fiber cable clamp installed on a fiber optic cable.

The fiber sheath grips 104, shown in detail in FIGS. 8-10, connect the cable separator 102 to the cable sheath 12 and grip the cable sheath 12, thereby substantially fixing the axial positional relationship between the strength member 14 and the cable sheath 12 of the cable 10. The fiber sheath grips 104 flare to a point including an opening configured to receive the fastener for connection to the cable separator 102. At the opposite end, each of the fiber sheath grips 104 includes a plurality of sheath grip teeth 118 along at least a portion of the lateral edges of the grip 104. The sheath grip teeth 118 are oriented toward the cable sheath 12 to engage the sheath and prevent it from slipping along the sheath grips 104 when engaged with the cable 10. A hose clamp 120 surrounds the optical cable 10 and the fiber sheath grips 104 at a position proximate to the plurality of teeth, such that the sheath grips 104 are compressed into the cable sheath 12.

In the embodiment shown, two fiber sheath grips 104 are placed on opposed sides of the cable 10, and include sheath grip teeth 118 along a portion of the cable contacted by the fiber sheath grips 104. In various other embodiments, more or fewer teeth, and various alternative numbers/shapes of fiber sheath grips are possible as well.

The fiber sheath grips 104 optionally include one or more protrusions 122 incorporated on the outer surface. The protrusions are configured to provide a location for attachment of a mounting structure 124, shown in FIGS. 11-13. The mounting structure includes a first attachment location 125, which includes openings 126 configured to mate with the protrusions to affix the mounting structure to the cable clamp 100. The mounting structure 124 also includes second attachment locations 128, which include openings 130 configured to allow attachment of the mounting structure 124 and cable clamp 100 to various locations. Various additional configurations of the mounting structure are possible as well.

Referring now to FIG. 14-24, a second fiber cable clamp 200 is disclosed. In this embodiment, the fiber cable clamp 200 includes a sheath grip housing 202 and a cable fiber separator, shown as a fiber separation insert 204. The sheath grip housing 202, shown in detail in FIGS. 16-19 includes a flare tube 206, and a plurality of sheath grip members 208. The sheath grip members 208 extend from the flare tube 206, and are configured to surround a cable 10, as in the embodiment of FIGS. 1-13. The sheath grip members 208 each include a plurality of ridges 210 configured to grip the fiber sheath 12 when the fiber cable clamp 200 is installed on a cable 10. In the embodiment shown, three sheath grip members 208 extend along the cable 10 from the flare tube 206, and the ridges 210 reside on interior surfaces of the sheath grip members 208 facing the cable sheath 12, preventing sheath from slipping through the sheath grip members. In additional embodiments, more or fewer sheath grip members 208, having more or fewer ridges 210 than shown in FIGS. 12-20 may extend from the flare tube 206.

Figure 22:
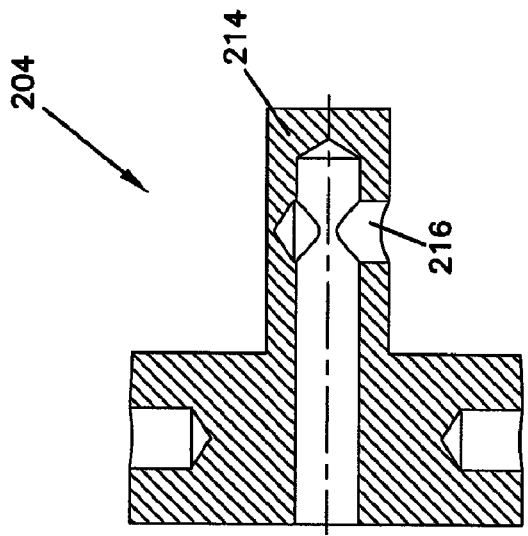
FIG. 22 is a cross-sectional side view of the separator insert of FIG. 20.
Figure 20:
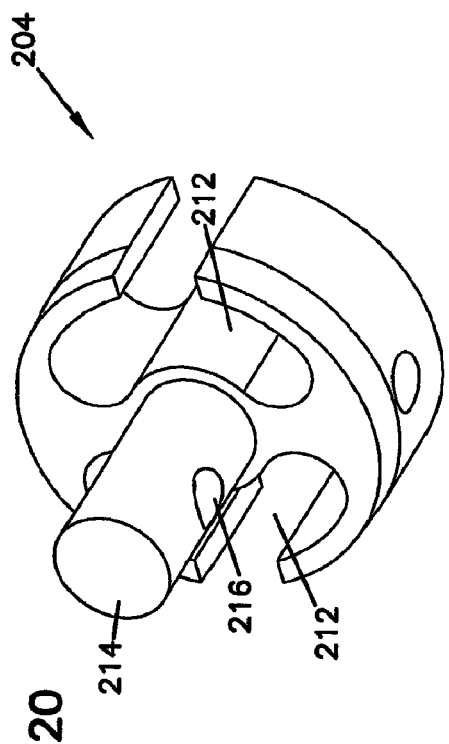
FIG. 20 is a perspective view of a separator insert of the fiber cable clamp of FIG. 14.
Figure 21:
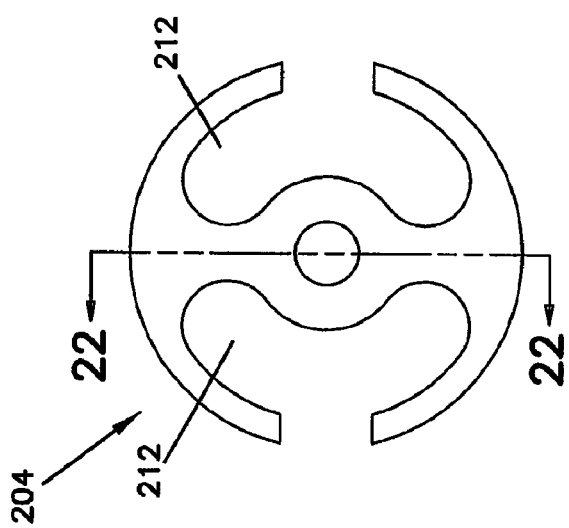
FIG. 21 is a front plan view of the separator insert of FIG. 20.

A fiber separation insert 204, shown in detail in FIGS. 20-22, is received within the flare tube 206. The fiber separation insert 204 extends from the flare tube 206, and is configured to be fixedly attached to the flare tube. The insert 204 includes a plurality of openings 212 configured to allow optical fibers 16 of the cable to pass through, along with furcation tubes 18 installed over the optical fibers. Each of the openings 212 allow passage of one or more furcation tubes 18 and optical fibers 16. In the embodiment shown, two or more optical fibers 16 and corresponding furcation tubes 18 fit through each opening 212. In other embodiments, a single optical fiber 16 may pass through each opening 212, depending upon the number of openings in the insert 204 and the number of fibers 16 in the cable 10.

The fiber separation insert 204 includes a strength member clamp 214 integrated with the insert 204, along a central axis. The strength member clamp 214 extends beyond the flare tube 206, and is configured to accept the central strength member 14 of the cable 10 to clamp the central strength member in place within the insert 204. The strength member clamp 214 includes a fastener opening 216 in the portion of the clamp protruding from the flare tube 206. The fastener opening 216 is configured to accept a fastener 218, in the embodiment of FIGS. 12-20 shown as a set screw. The fastener opening 216 and set screw hold the strength member 14 in a constant position within the strength member clamp 214, to prevent the strength member 14 from receding from the clamp. In further embodiments, the fastener opening 216 can accept various types of fasteners, such as an adjustable pin, clamp, or other connector designed to hold the strength member 14. Additional types of fasteners 218 are possible as well.

Figure 15:
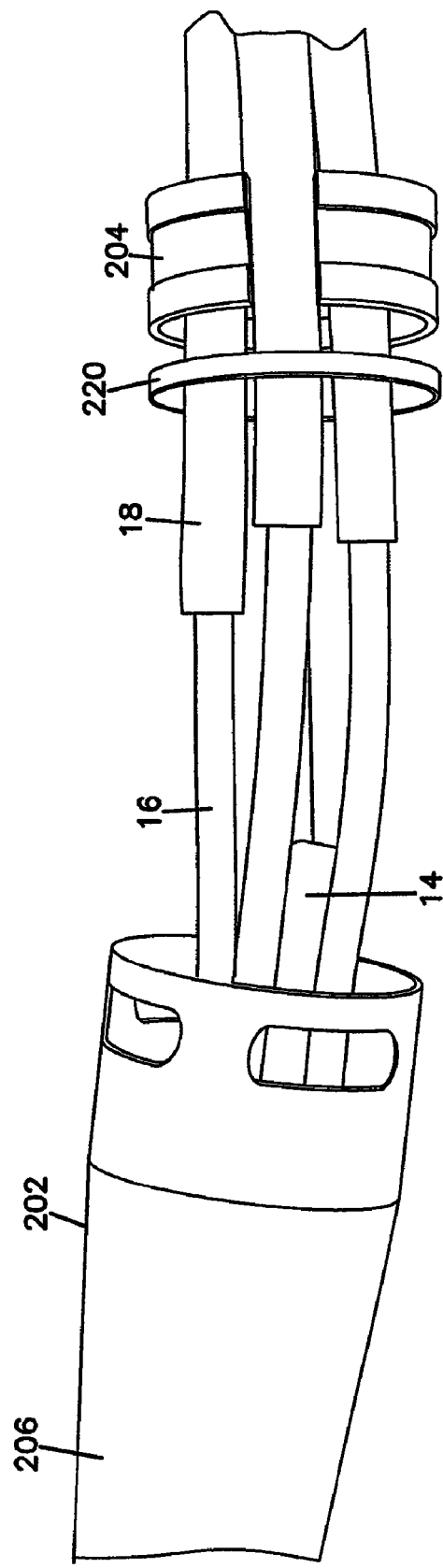
FIG. 15 is a disassembled perspective view of the fiber cable clamp of FIG. 14.
Figure 16:
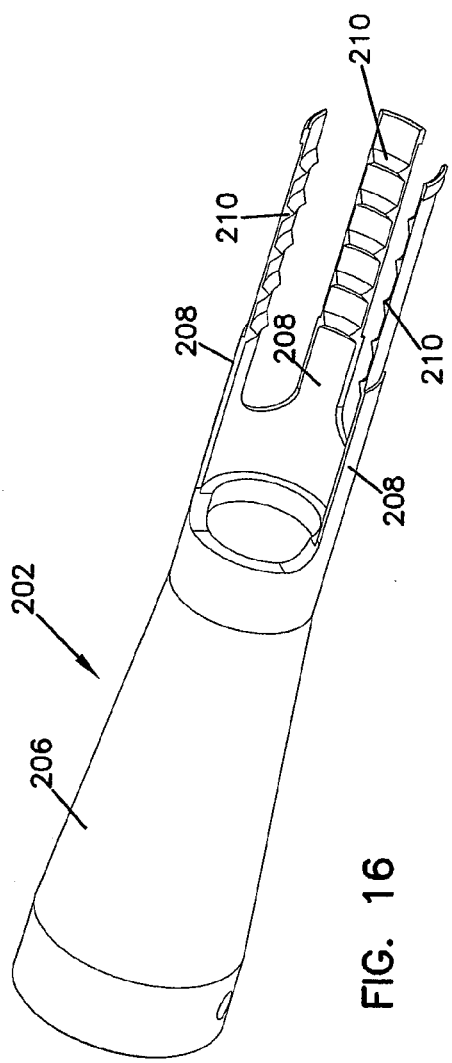
FIG. 16 is a perspective view of a cable separator housing of the fiber cable clamp of FIG. 14.
Figure 19:
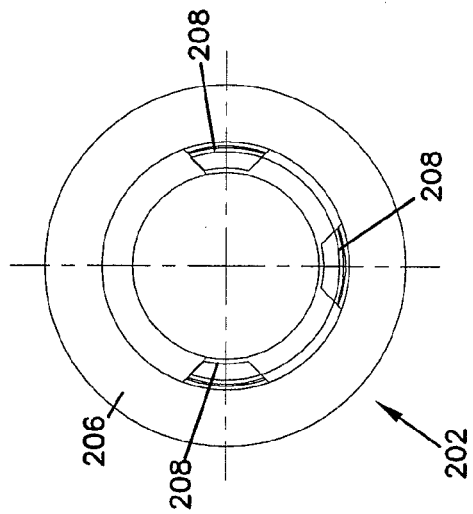
FIG. 19 is a front plan view of the cable separator housing of FIG. 16.
Figure 17:
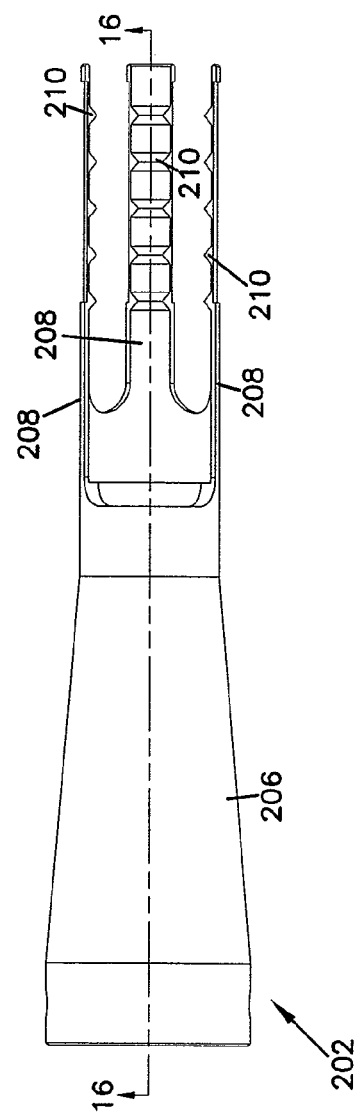
FIG. 17 is a side plan view of the cable separator housing of FIG. 16.
Figure 18:
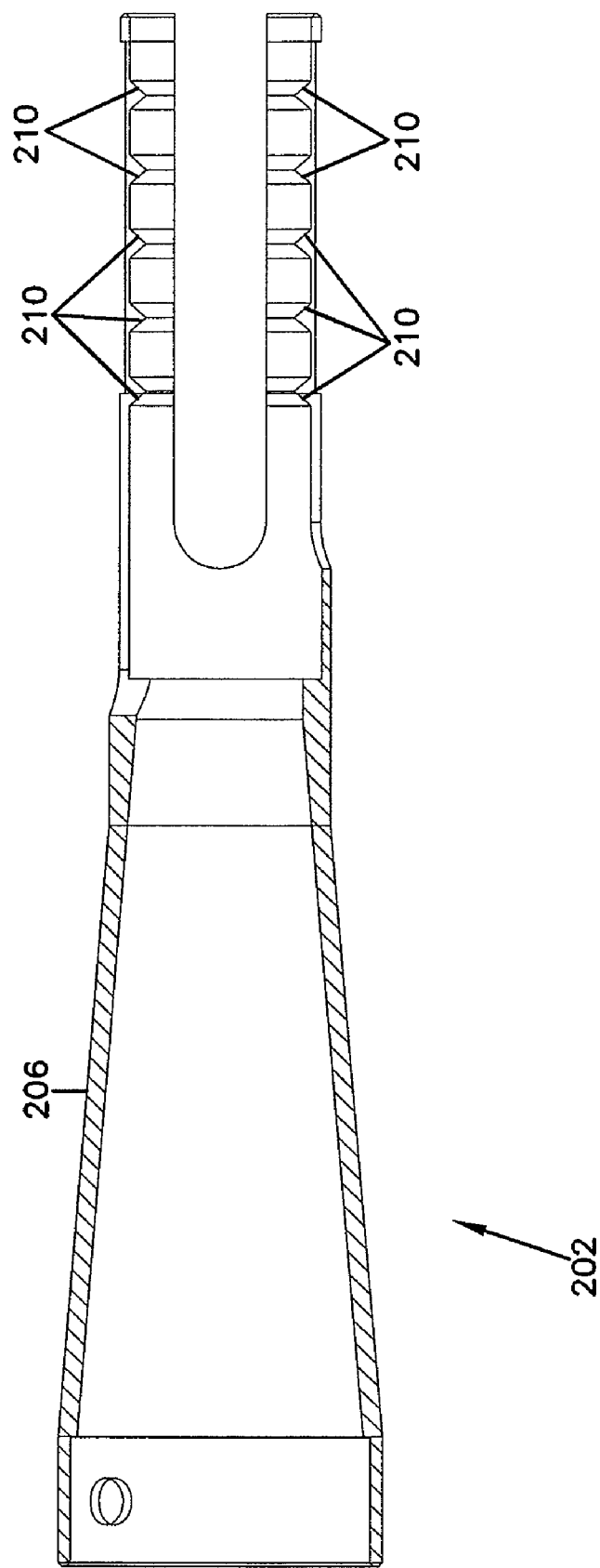
FIG. 18 is a cross-sectional side view of the cable separator housing of FIG. 16.
Figure 23:
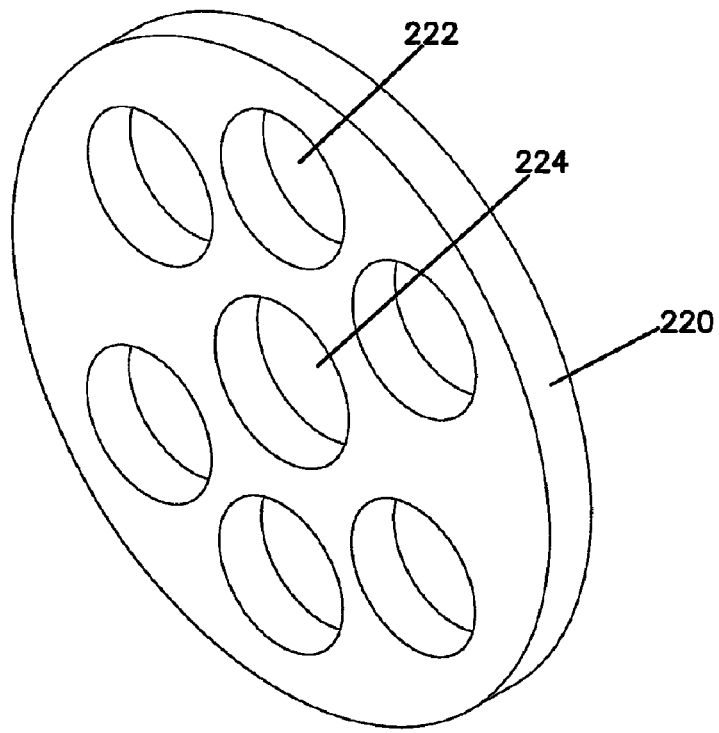
FIG. 23 is a perspective view of a retention plate of the fiber cable clamp of FIG. 14.
Figure 24:
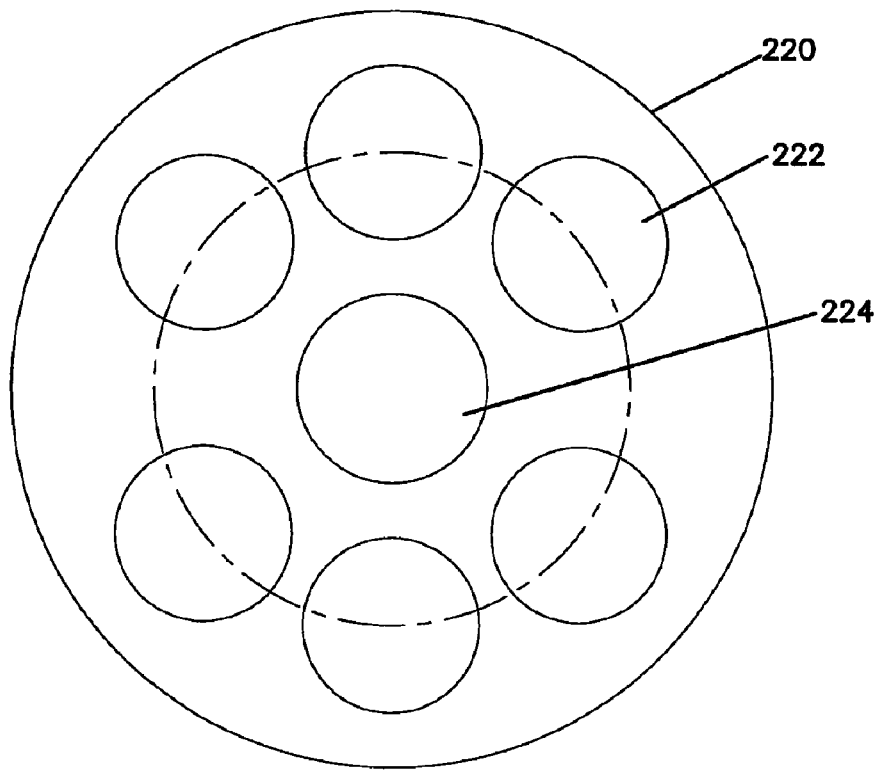
FIG. 24 is a front plan view of the retention plate of FIG. 23.
Figure 25:
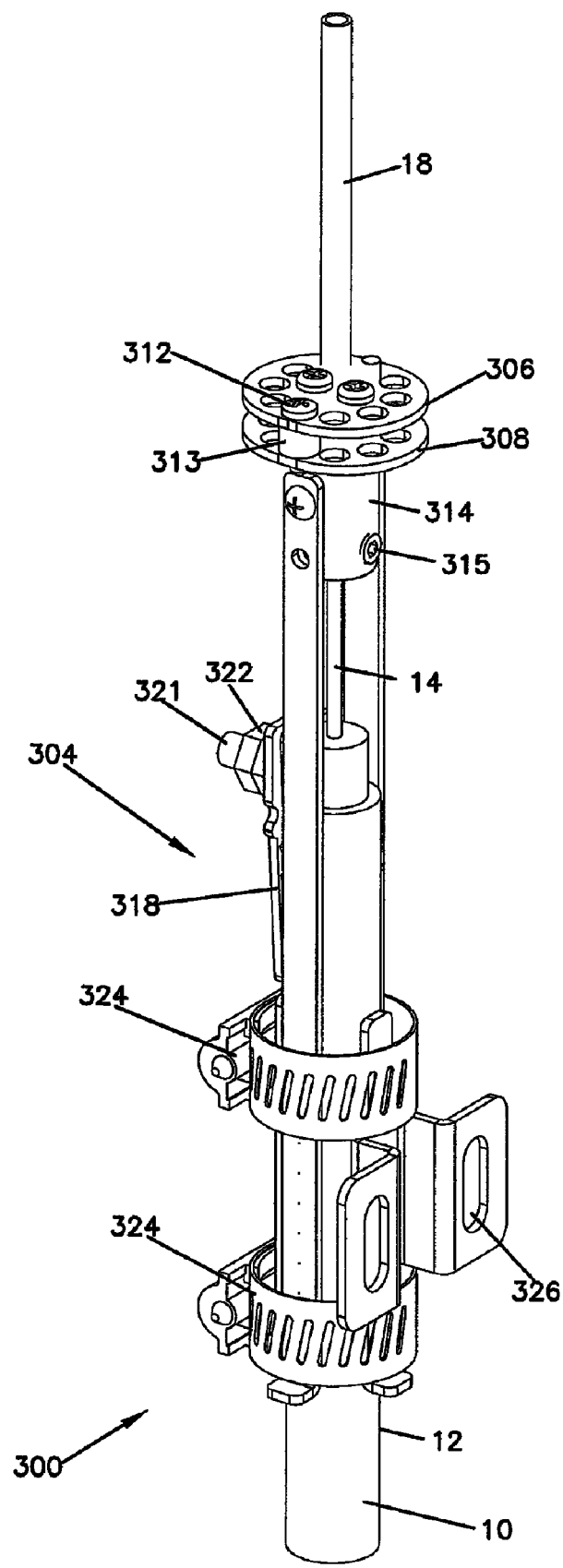
FIG. 25 is a perspective view of a third possible embodiment of a fiber cable clamp installable onto a fiber optic cable.
Figure 26:
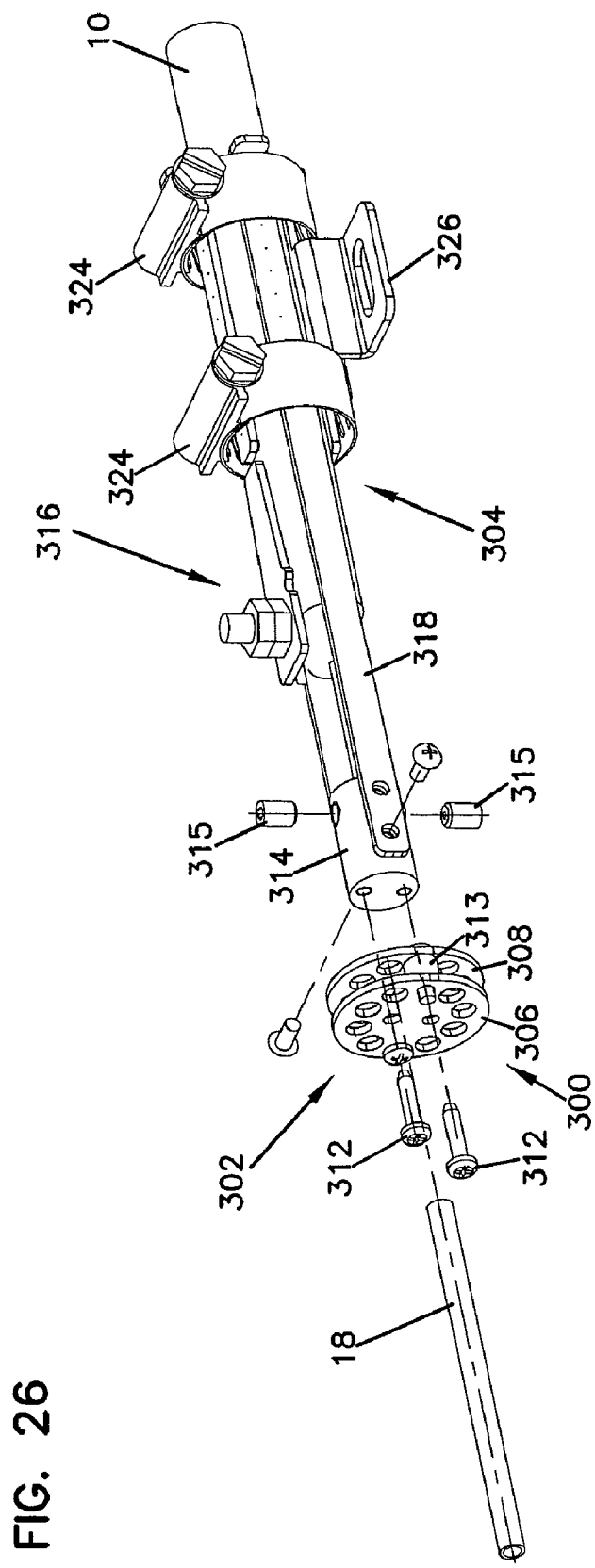
FIG. 26 is an exploded perspective view of the fiber cable clamp of FIG. 25.
Figure 27:
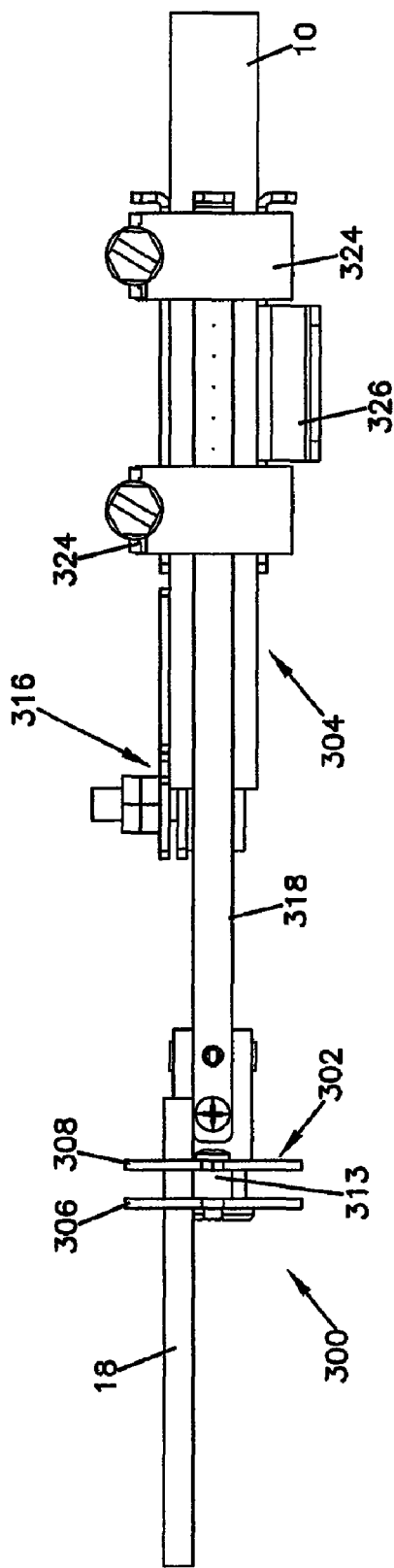
FIG. 27 is a side plan view of the fiber cable clamp of FIG. 25.
Figure 28:
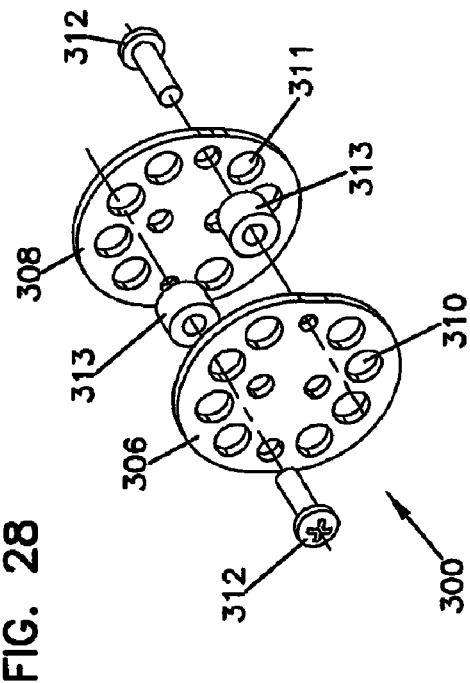
FIG. 28 is an exploded perspective view of a cable fiber separator used in the fiber cable clamp of FIG. 25.
Figure 29:
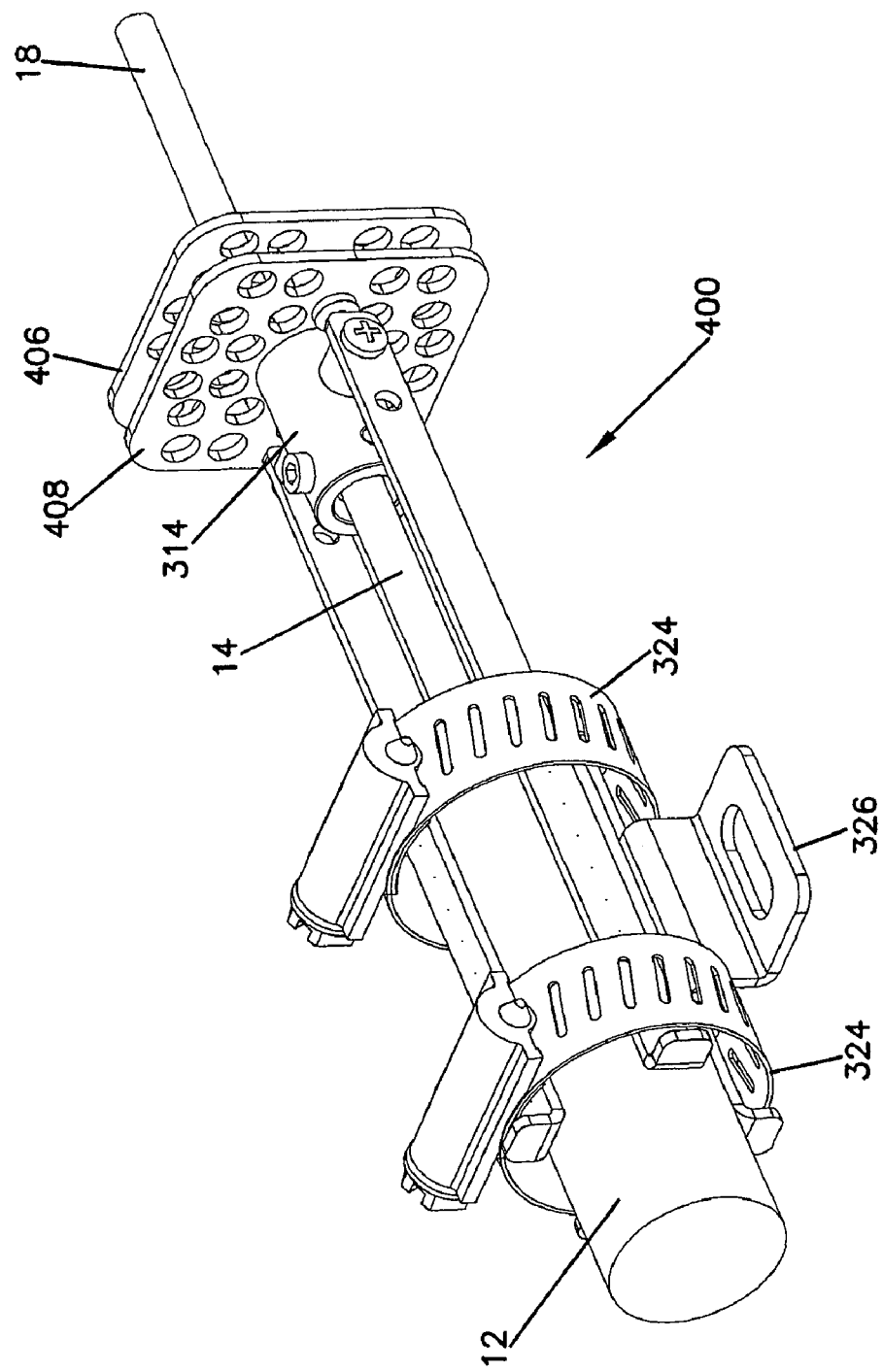
FIG. 29 is a perspective view of a fourth possible embodiment of a fiber cable clamp installable onto a fiber optic cable.
Figure 30:
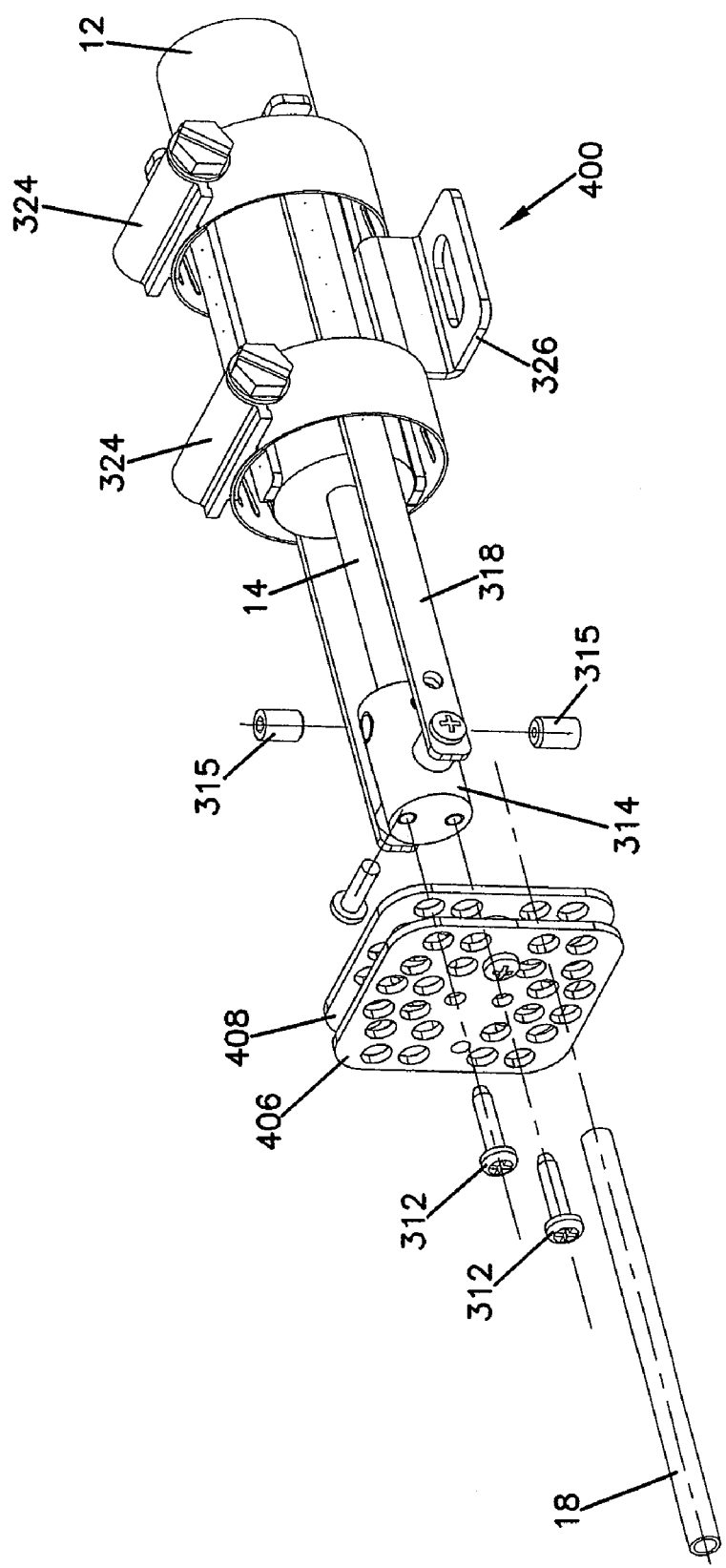
FIG. 30 is an exploded perspective view of the fiber cable clamp of FIG. 29.
Figure 31:
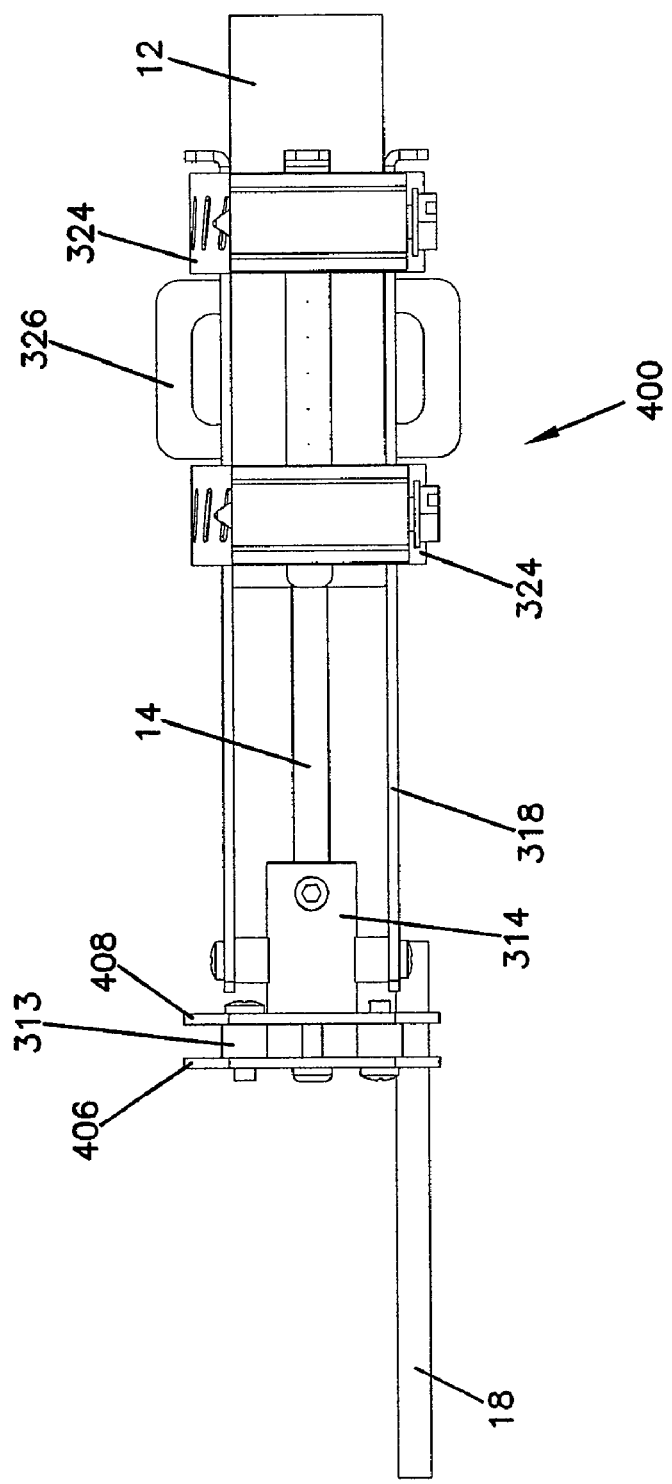
FIG. 31 is a side plan view of the fiber cable clamp of FIG. 29.
Figure 32:
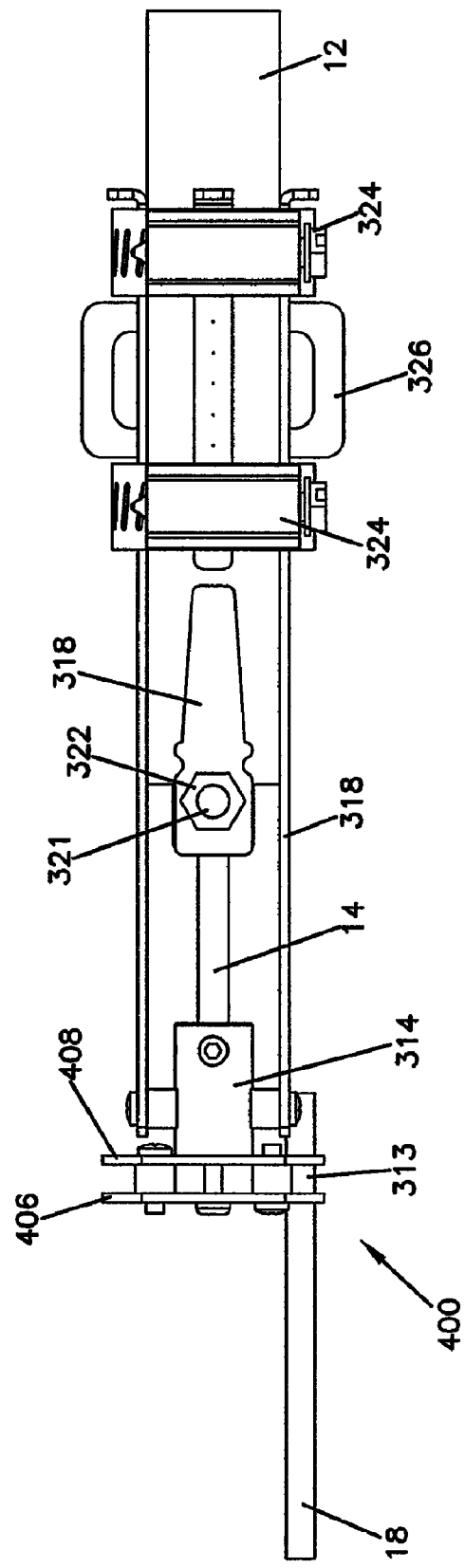
FIG. 32 is a side plan view of the fiber cable clamp of FIG. 29, opposite the view of FIG. 31.
Figure 33:
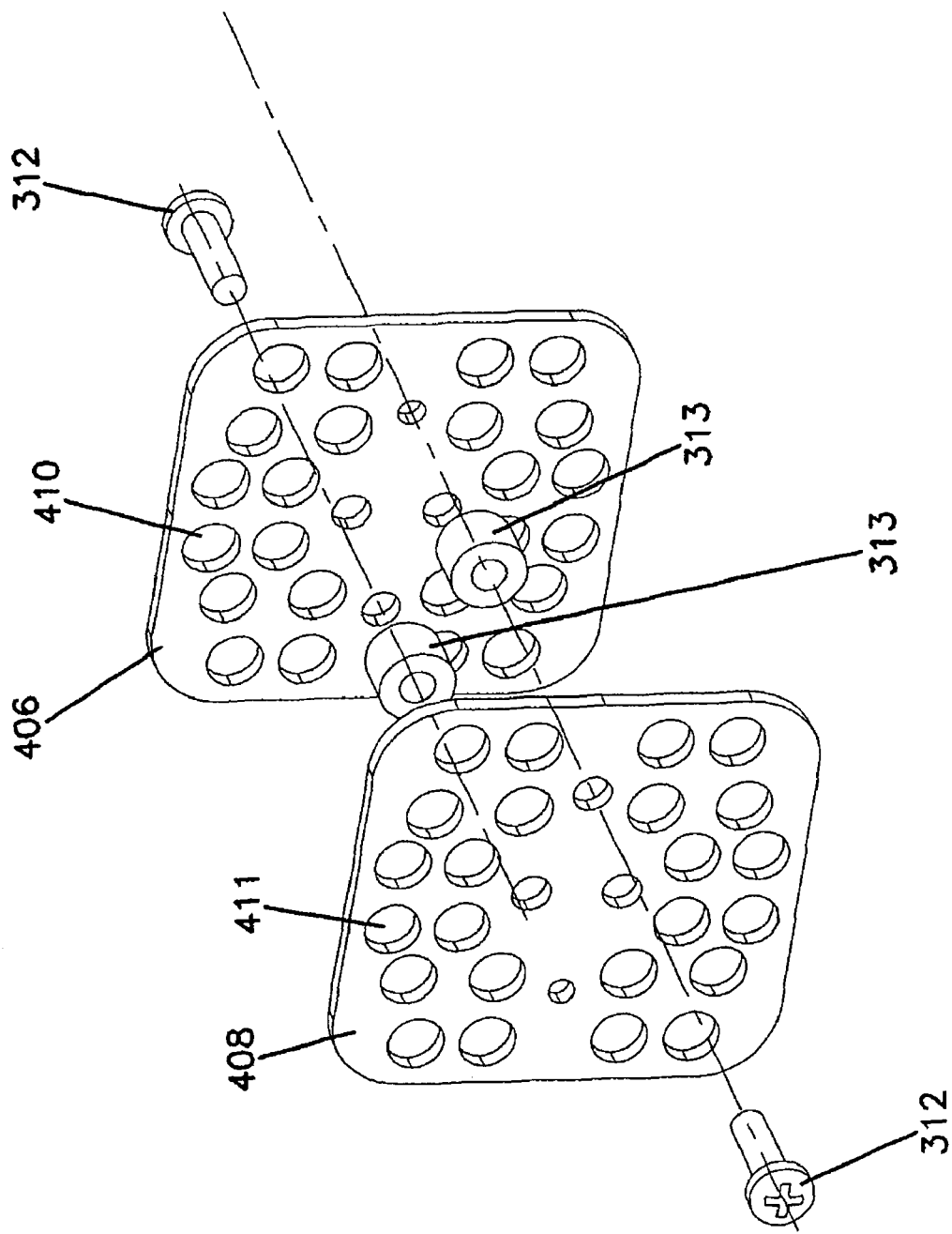
FIG. 33 is an exploded perspective view of a cable fiber separator used in the fiber cable clamp of FIG. 29.
Figure 34:
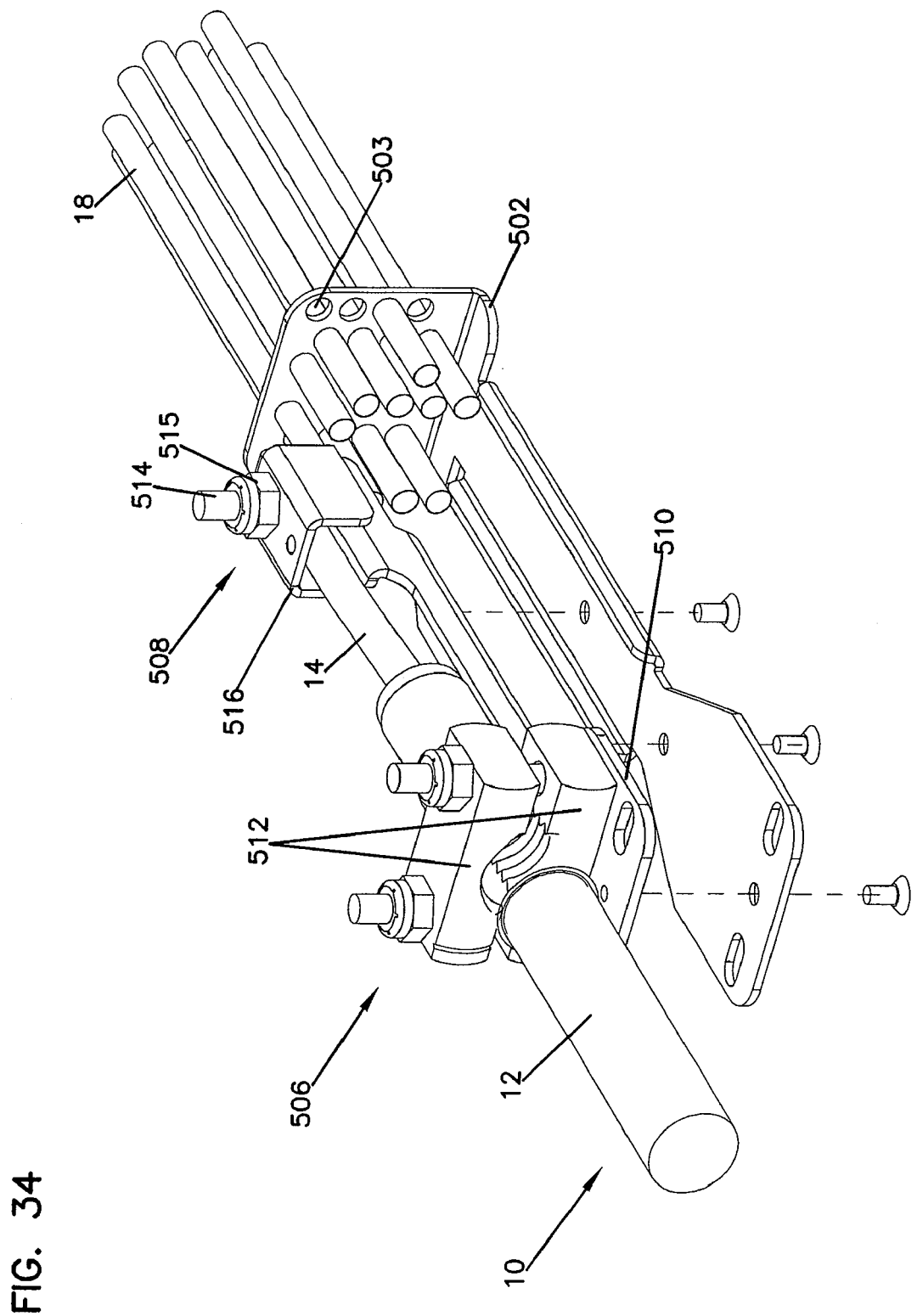
FIG. 34 is a perspective view of a fifth possible embodiment of a fiber cable clamp installable onto a fiber optic cable.
Figure 35:
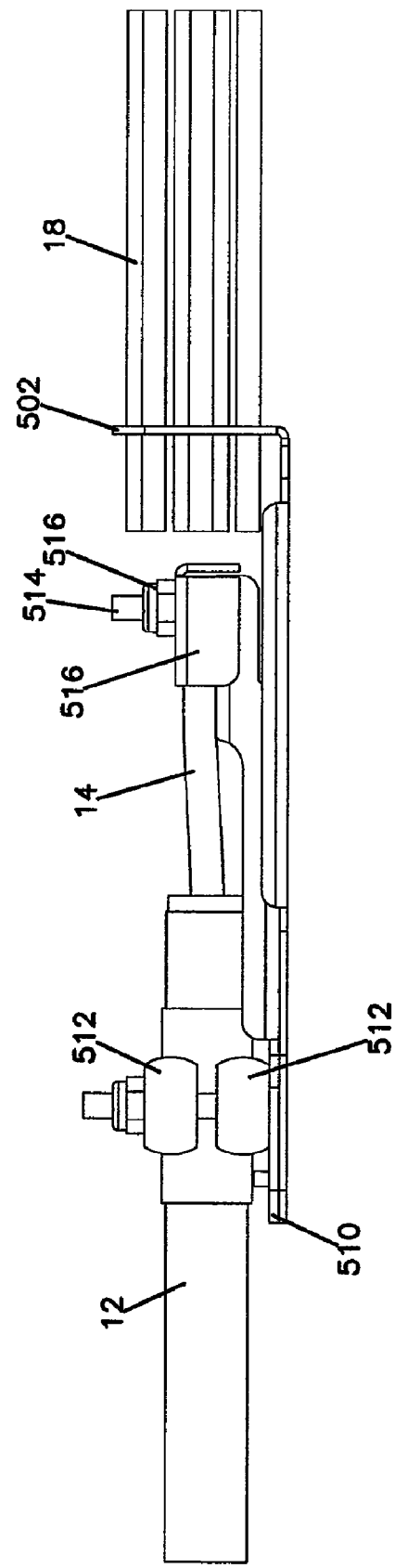
FIG. 35 is a is a side plan view of the fiber cable clamp of FIG. 34.
Figure 36:
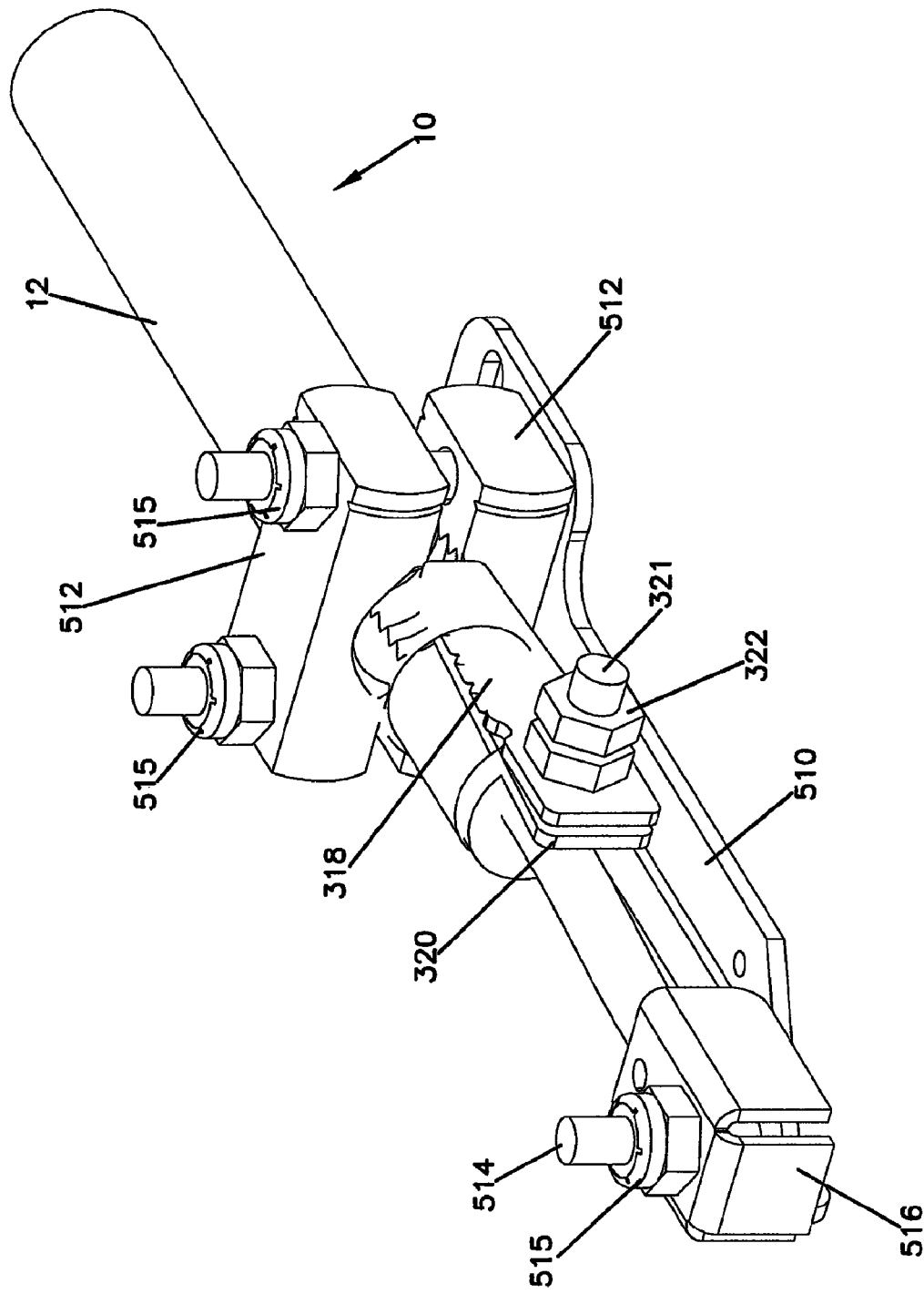
FIG. 36 is a perspective view of the fiber cable clamp of FIG. 34, with the cable fiber separator removed.
Figure 37:
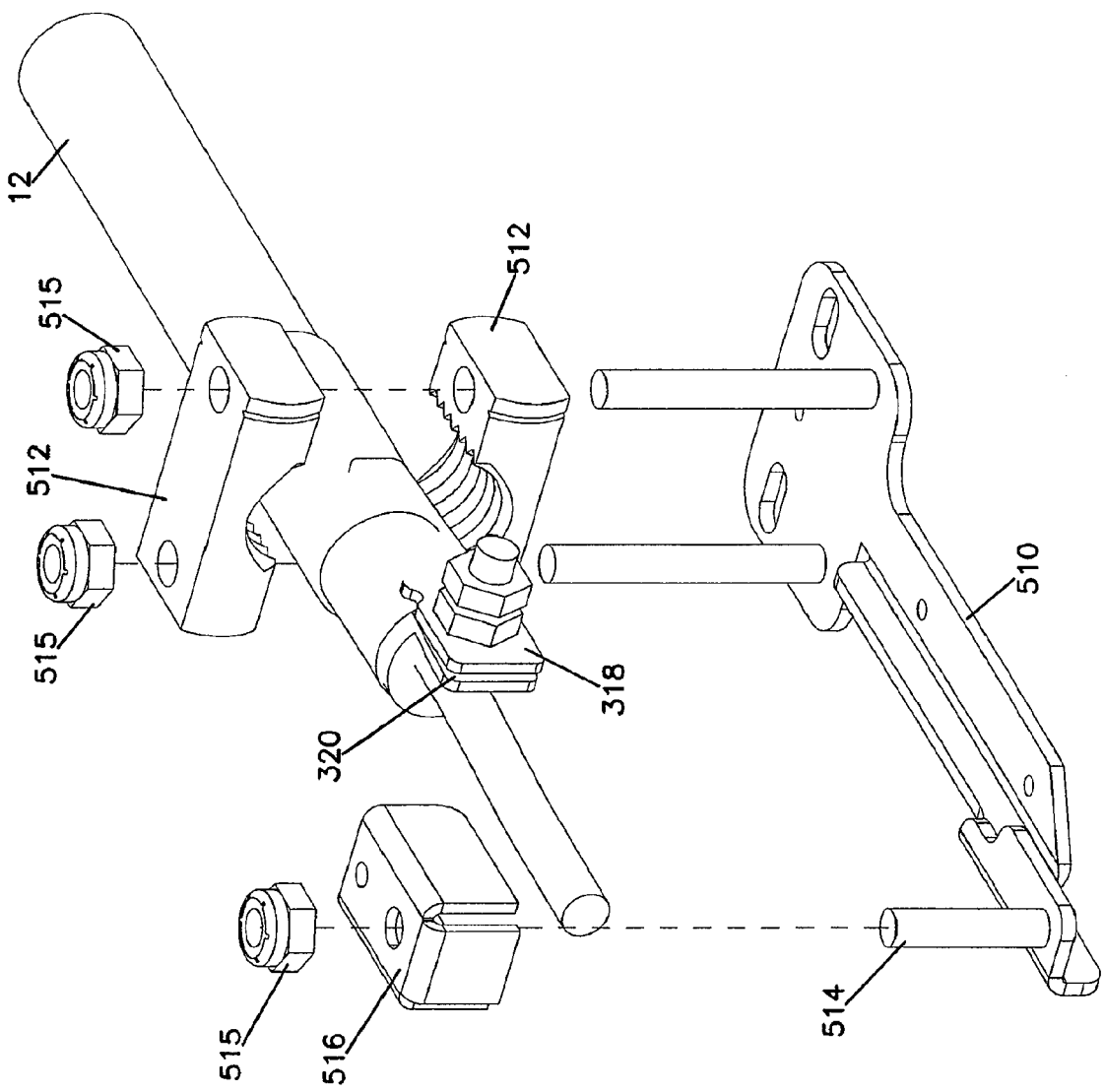
FIG. 37 is an exploded perspective view of the fiber cable clamp of FIG. 34, with the cable fiber separator removed.

A retention plate 220, seen in FIGS. 15 and 23-24, is sized to fit within the flare tube 206, and includes a plurality of openings 222 configured to allow furcation tubes 18 and optical fibers 16 to pass through. The retention plate 220 is installed onto the fibers 16 and furcation tubes 18 prior to the fiber separation insert 204. The openings 222 in the retention plate act to grip the furcation tubes 18 in a manner analogous to the retention plate 108 of the embodiment of FIGS. 1-13. A central opening 224 allows the strength member to pass through the retention plate and enter the strength member clamp 214.

An optional hose clamp 222 encircles the cable 10 and sheath grip members 208. The hose clamp 222 compresses the sheath grip members 208 into the sheath 12 of the fiber optic cable 10, to assist in preventing the sheath from slipping from the grip of the sheath grip members 208 by adding an adjustable amount of compression force on the sheath grip members.

The connection between the sheath grip housing 202 and fiber separation insert 204, which grip the sheath 12 and strength member 14, respectively, prevent axial movement of those portions of the cable relative to each other, thereby preventing possible signal loss in situations where the cable 10 is exposed to temperature extremes. Additional applications and configurations of the cable clamp 200 are possible as well, such as in fiber mounting or protection applications.

Referring now to FIGS. 25-28, a fiber cable clamp 300 is shown according to a third possible embodiment of the present disclosure. In this embodiment, the fiber cable clamp 300 includes a cable separator 302 and a fiber sheath grip assembly 304. The cable separator 302, shown in detail in FIG. 28, includes a pair of disks 306, 308. The disks include complementary openings 310, 311, respectively, disposed to provide a transverse path allowing optical fibers to pass therethrough. The disks 306, 308 are detachably connected by one or more fasteners, such as screws 312. Each pair of openings 310, 311 allow passage of one or more furcation tubes 18 through both disks, and at least one of the openings is sized to grip the furcation tubes 18 inserted through the disks, as described above in connection with the clamp 100 of FIGS. 1-13. Optionally, spacers 313 are affixed between the disks 306, 308 by the screws 312 to assist in insertion of the furcation tubes 18. The disks prevent axial movement of furcation tubes 18 relative to the fiber cable clamp 300.

The disks 306, 308 are generally circular in shape and affixed to a central strength member clamp 314 by the screws 312. The strength member clamp 314 affixes to a strength member 14 of the optical cable protruding from the cable sheath 12. The strength member clamp 314 is axially alighted with the fiber optic cable 10, and accepts insertion of the strength member 14. Fasteners 315 are insertable into the strength member clamp 314 to affix the strength member clamp to the strength member 14.

The cable sheath grip assembly 304 optionally includes cable sheath grip 316, and one or more extensions 318 affixable to the strength member clamp 314. The cable sheath grip 316, shown in detail in FIGS. 40-42, includes a grip member 318 having a plurality of ridges 319 facing the cable sheath 12. An insert 320 passes under the cable sheath 12 and includes a fastener location 321. A fastener, such as one or more nuts 322, can thread onto the fastener location or otherwise attach the grip member 318 to the insert 320, thereby engaging and holding the cable sheath 12 therebetween by pressing the ridges 319 toward the insert 320.

As in the above embodiments of the fiber cable clamp, hose clamps 324 may be used to affix the cable sheath grip assembly 304 to the cable sheath 12. Hose clamps 324 provide concentric pressure on the cable sheath 12, analogous to the hose clamps 120, 222, described above. Furthermore, a mounting structure 326, analogous to mounting structure 124 of FIGS. 11-13 is optionally affixed along one or more of the extensions 318 as well.

Referring now to FIGS. 29-33, a fiber cable clamp 400 is shown according to a fourth possible embodiment of the present disclosure. The fiber cable clamp 400 generally corresponds to the clamp 300 of FIGS. 25-29, but includes disks 406, 408 in place of the disks 306, 308 of FIGS. 25-28. Disks 406, 408 are generally rectangular in shape, although the disks optionally have radiused corners. The disks 406, 408 include openings 410, 411, respectively, which are arranged non-radially about the strength member clamp 314. Additional shapes and configurations of the disks 406, 408 and openings 410, 411 beyond those shown are possible as well.

Referring now to FIGS. 34-37, a fiber cable clamp 500 is shown according to a fifth possible embodiment of the present disclosure. The fiber cable clamp 500 includes a cable separator 502 and a cable clamp assembly 504. The cable separator 502 is a bent metal fiber separator having a plurality of openings 503 defining transverse paths allowing optical fibers 16 to pass through the separator. The openings 503 grip furcation tubes 18 shrouding the optical fibers 16, preventing axial movement of the furcation tubes along the length of the cable 10.

The cable clamp assembly 504 to which the separator 502 is connected includes a sheath grip assembly 506 and a strength member clamp 508 attached together at a base plate 510. The common affixation of the strength member clamp 508 and the sheath grip assembly 506 to the base plate 510 maintains the axial positions of the strength member 14 and the cable sheath 12 with respect to each other.

Figure 40:
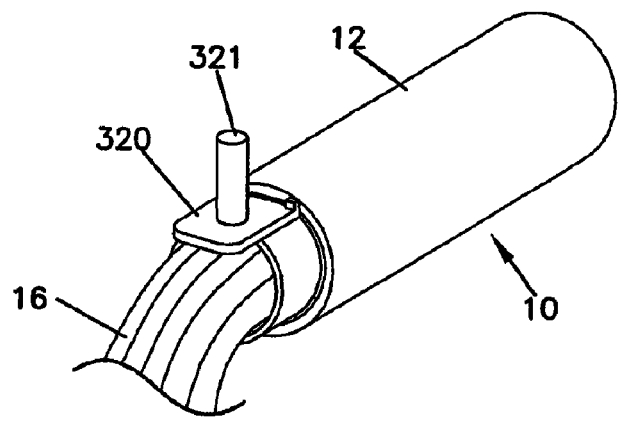
FIG. 40 is a perspective view of a cable sheath grip used in conjunction with the fiber cable clamps of the present disclosure, installed onto a multifiber optical cable.
Figure 41:
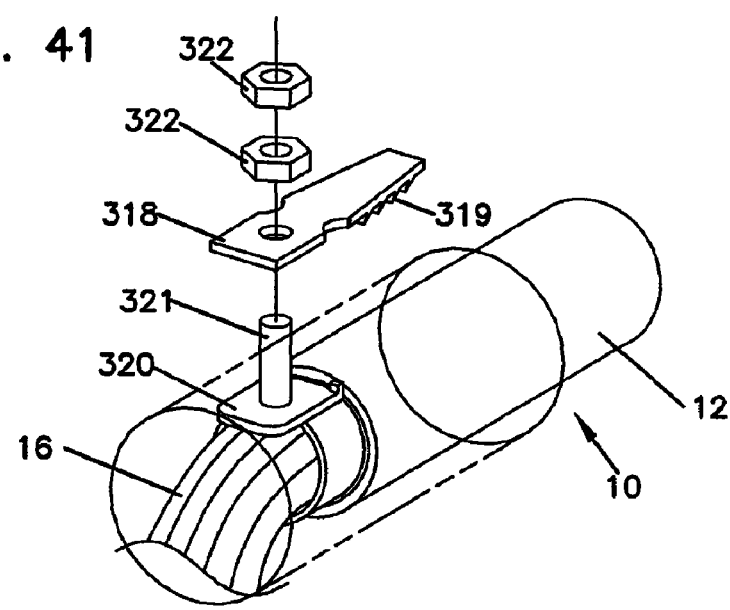
FIG. 41 is an exploded view of the cable sheath grip of FIG. 40.
Figure 42:
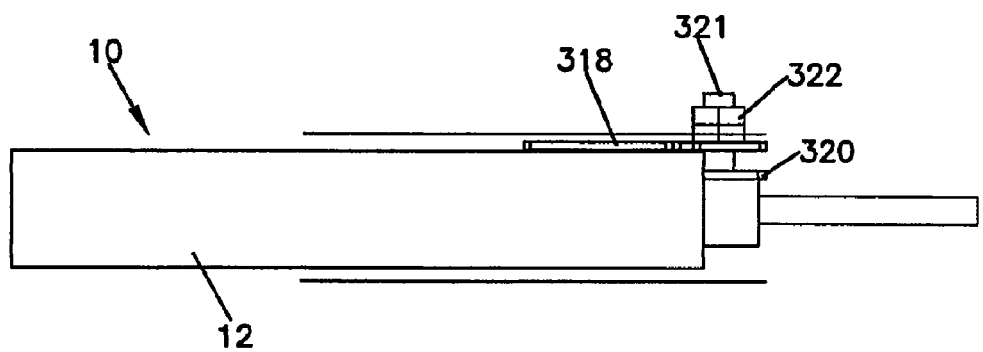
FIG. 42 is a side view of the cable sheath grip of FIG. 40.

The sheath grip assembly 506 includes a pair of sheath grip members 512, or yokes, which can be bolted to extensions of the base plate 510 using nuts 515 or other fasteners to form a circular, ridged ring that surrounds and grips the cable sheath 12. The sheath grip assembly also optionally includes an additional cable sheath grip 316, as shown in FIGS. 40-42 and previously described. The strength member clamp 508 includes a post 514, such as a threaded bolt, extending from the base plate 510 and a cap 516 which can be affixed over the post 514 using a fastener such as a nut 515. The cap 516 includes a retention mechanism for gripping the strength member 14 when the cap 516 is fastened to the post 514. Other configurations of the strength member clamp are possible as well. The cable sheath grip 316 and strength member clamp 508 cooperate to maintain the relative axial position of the cable sheath 12 to the strength member 14.

The base plate 510 includes a plurality of mounting locations (not shown) which allow the base plate to be mounted to a wall, fiber cabinet, or other structure. The mounting locations also optionally provide a means by which the cable fiber separator 502 can be attached to the cable clamp assembly 504, for example by bolts or other attachment configurations.

Figure 38:
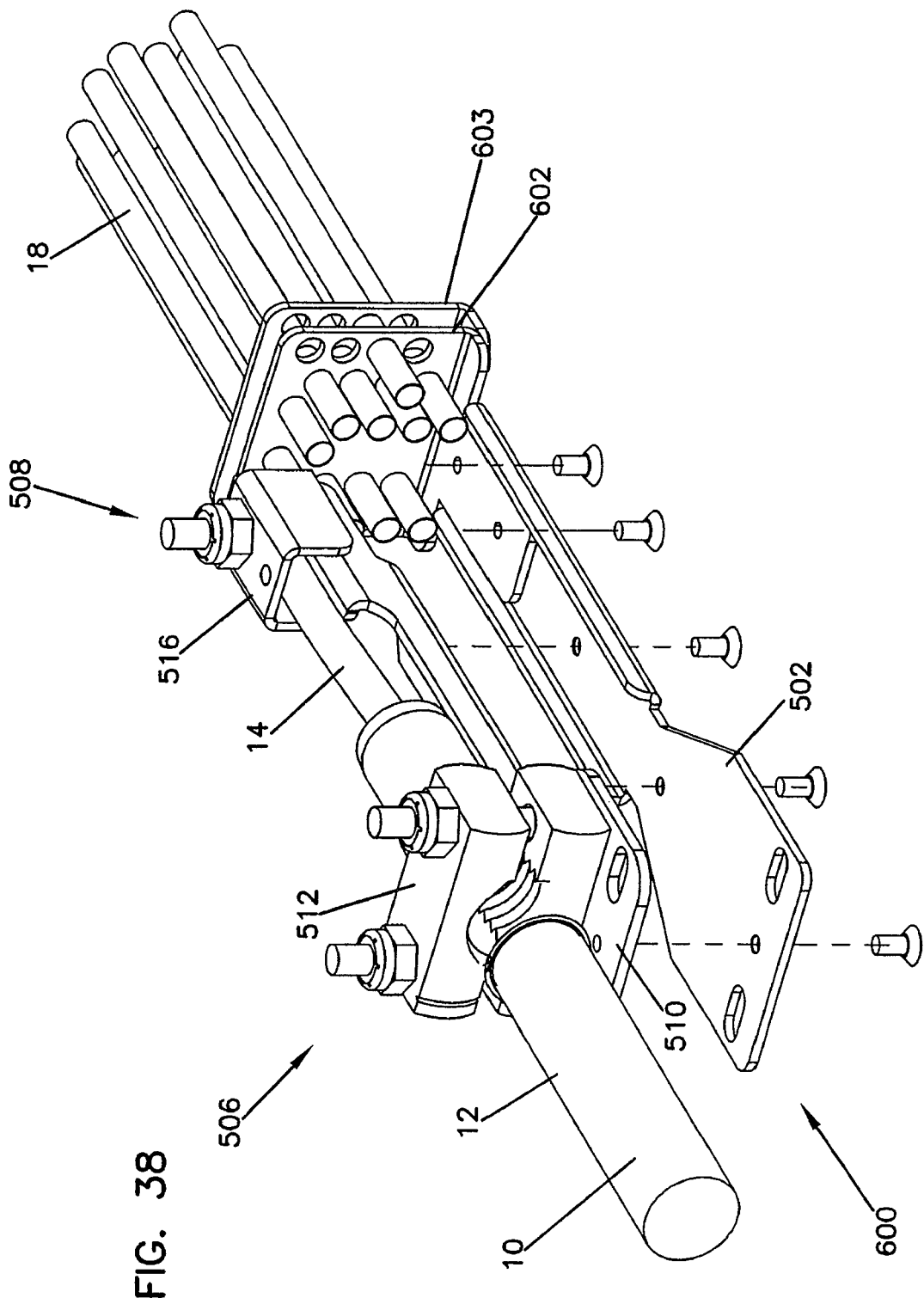
FIG. 38 is a perspective view of a sixth possible embodiment of a fiber cable clamp installable onto a fiber optic cable.
Figure 39:
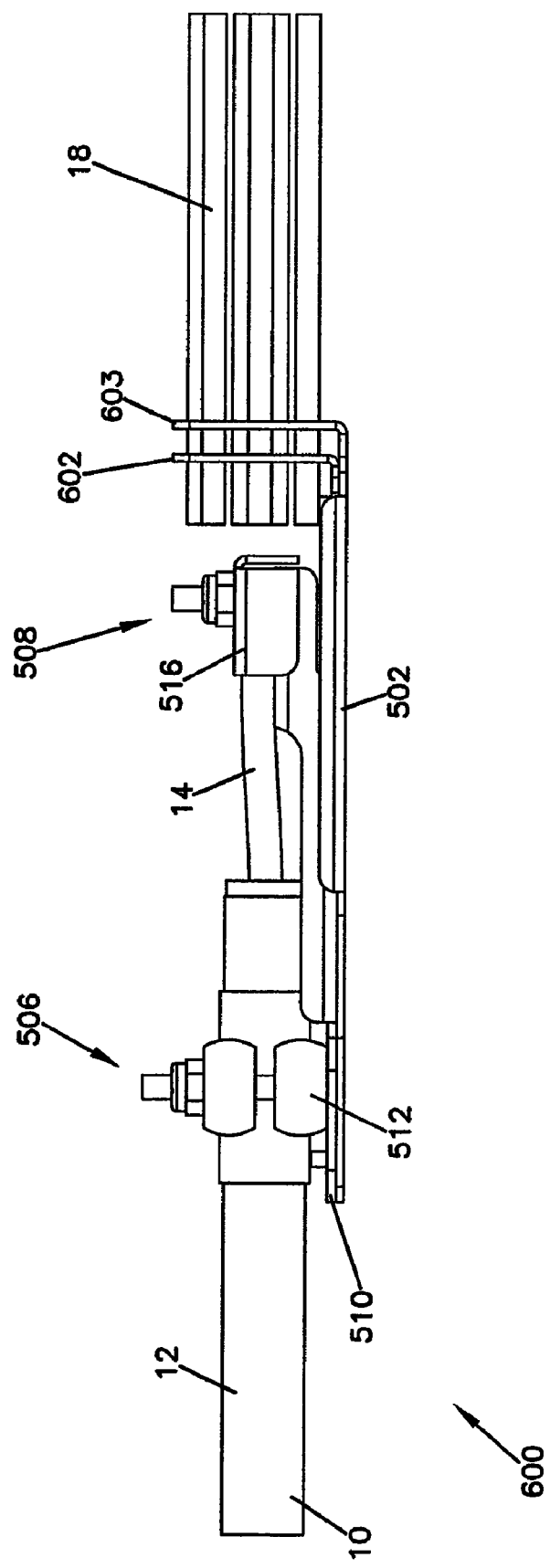
FIG. 39 is a side plan view of the fiber cable clamp of FIG. 38.

FIGS. 38-39 show a fiber cable clamp 600 according to a sixth possible embodiment of the present disclosure. The fiber cable clamp 600 generally corresponds to the clamp 500 of FIGS. 34-37; however, in this additional embodiment, the cable separator 502 of the clamp 600 includes two generally parallel rectangular walls 602, 603, which each include complementary openings 503 defining transverse paths allowing optical fibers 16 to pass through the separator. The openings 503 in each wall can be used for holding furcation tubes 18. The openings 503 allow a furcation tube to be inserted through each wall, and the pair of walls 602, 603 coordinate to assist in gripping the furcation tubes. As in the previously-described embodiment, the openings 503 grip furcation tubes 18 shrouding the optical fibers 16, preventing axial movement of the furcation tubes along the length of the cable 10.

To install one of the cable clamps described herein onto a fiber optic cable 10, the strength member clamp (e.g. strength member clamp 314) is clamped to a central strength member 14 of the cable 10. The extensions (e.g. extensions 318) are attached to the clamp, and are attached to the cable sheath 12 by hose clamps (e.g. hose clamps 120, 324). The disks or other cable fiber separator component of the selected embodiment of the cable clamp (e.g. disks 106 and 108, disks 306 and 308, or disks 406 and 408) are installed over fiber optic cables 16. Furcation tubes 18 are installed over the cables 16 and inserted into openings in the disks or separator, as described above. The disks or separator of the selected embodiment are then connected onto the strength member clamp if not already integrated therewith, such as disk 106 of FIGS. 1-5. Other methods of assembly are possible as well, depending upon the chosen embodiment of the fiber optic cable clamp or the configuration of optical fibers employed.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of maintaining the relative axial locations of a cable sheath, furcation tubes and a cable strength member in an optical cable, the method comprising:
   providing a fiber optic cable including a plurality of optical fibers and a strength member protruding from a cable sheath;
   clamping a strength member clamp to the portion of the strength member protruding from the cable sheath;
   clamping a sheath grip member to the cable sheath;
   installing a cable fiber separator onto the plurality of optical fibers, the cable fiber separator comprising:
   (a) a plurality of plates including at least a first plate connected to the sheath grip member and a fiber retention plate adjacent to the first plate, the fiber retention plate including openings sized to grip furcation tubes of a fiber optic cable and the first plate including complementary openings to receive the furcation tubes; and
   (b) a plurality of cable fiber openings located through each of the plurality of plates and sized to retain furcation tubes encasing separated fibers,
   wherein the installing of the cable fiber separator results in one or more of the plurality of optical fibers passing through the plurality of openings of the cable fiber separator; and
   installing a furcation tube over one or more of the optical fibers and into an opening of the cable fiber separator.

2. The method of claim 1, further comprising connecting the cable fiber separator to the strength member clamp.

3. The method of claim 1, wherein clamping a sheath grip member to the cable sheath comprises tightening a hose clamp around the sheath grip member and the cable sheath.

4. The method of claim 1, wherein clamping the cable fiber separator to the portion of the strength member protruding from the cable sheath comprises tightening a set screw to engage the strength member.

5. The method of claim 1, further comprising inserting the furcation tubes into a plurality of openings of a disk adjacent to the cable fiber separator.

6. The method of claim 1, whereby relative axial locations of the cable sheath, furcation tube, and cable strength member are maintained.

7. The method of claim 1, further comprising connecting the cable fiber separator to the sheath grip member via a base plate.

8. The method of claim 1, further comprising installing a furcation tube over each of the optical fibers and into a respective opening of the cable fiber separator.

9. A method of maintaining the relative axial locations of a cable sheath, a furcation tube, and a cable strength member in an optical cable, the method comprising:
   clamping a strength member clamp to a portion of a strength member protruding from a cable sheath of a fiber optic cable, the fiber optic cable including a plurality of optical fibers and the strength member protruding from the cable sheath;
   affixing a sheath grip member to the cable sheath;
   installing a cable fiber separator onto the plurality of optical fibers, the cable fiber separator comprising:
   (a) a plurality of plates including at least a first plate connected to the sheath grip member and a fiber retention plate adjacent to the first plate, the fiber retention plate including openings sized to grip furcation tubes of a fiber optic cable and the first plate including complementary openings to receive the furcation tubes; and
   (b) a plurality of cable fiber openings located through each of the plurality of plates and sized to retain furcation tubes encasing separated fibers,
   wherein the installing of the cable fiber separator results in first and second optical fibers of the plurality of optical fibers passing through first and second openings of the plurality of cable fiber openings; and
   installing a first furcation tube over the first optical fiber and into the first opening of the cable fiber separator.

10. The method of claim 9, further comprising installing a second furcation tube over the second optical fiber and into the second opening of the cable fiber separator.

11. The method of claim 9, further comprising connecting the cable fiber separator to the strength member clamp.

12. The method of claim 9, wherein affixing a sheath grip member to the cable sheath includes clamping the sheath grip member to the cable sheath.

13. The method of claim 9, wherein the strength member is integrated with at least a portion of the cable fiber separator.

14. The method of claim 13, wherein installing a cable fiber separator onto the plurality of optical fibers occurs prior to clamping a strength member clamp to the portion of the strength member.

* * * * *